US011785200B1

(12) United States Patent
Smits et al.

(10) Patent No.: US 11,785,200 B1
(45) Date of Patent: Oct. 10, 2023

(54) STAGE STUDIO FOR IMMERSIVE 3-D VIDEO CAPTURE

(71) Applicant: Summer Robotics, Inc., Campbell, CA (US)

(72) Inventors: Gerard Dirk Smits, Los Gatos, CA (US); Brian Alexander Paden, Scotts Valley, CA (US)

(73) Assignee: Summer Robotics, Inc., Campbell, CA (US)

( * ) Notice: Subject to any disclaimer, the term of this patent is extended or adjusted under 35 U.S.C. 154(b) by 0 days.

(21) Appl. No.: 18/121,486

(22) Filed: Mar. 14, 2023

Related U.S. Application Data

(60) Provisional application No. 63/269,323, filed on Mar. 14, 2022.

(51) Int. Cl.
*H04N 13/282* (2018.01)
*H04N 23/51* (2023.01)
*H04N 23/90* (2023.01)

(52) U.S. Cl.
CPC ........... *H04N 13/282* (2018.05); *H04N 23/51* (2023.01); *H04N 23/90* (2023.01)

(58) Field of Classification Search
CPC ....... H04N 13/282; H04N 23/90; H04N 23/60
See application file for complete search history.

(56) References Cited

U.S. PATENT DOCUMENTS

| 9,117,267 | B2 | 8/2015 | Francis, Jr. et al. |
| 9,489,735 | B1 | 11/2016 | Reitmayr |
| 2008/0012850 | A1 | 1/2008 | Keating, III |
| 2008/0165360 | A1 | 7/2008 | Johnston |
| 2008/0201101 | A1 | 8/2008 | Hebert et al. |
| 2009/0096994 | A1 | 4/2009 | Smits |
| 2015/0378023 | A1 | 12/2015 | Royo Royo et al. |

(Continued)

FOREIGN PATENT DOCUMENTS

| CN | 109458928 A | 3/2019 |
| CN | 112365585 A | 2/2021 |

(Continued)

OTHER PUBLICATIONS

Office Communication for U.S. Appl. No. 17/895,489 dated Apr. 11, 2023, pp. 1-36.

(Continued)

*Primary Examiner* — Jayanti K Patel
*Assistant Examiner* — Christopher Kingsbury Glover
(74) *Attorney, Agent, or Firm* — John W. Branch; Branch Partners PLLC

(57) ABSTRACT

Embodiments are directed providing a stage studio for immersive 3-D video capture. A two-dimensional video of a scene may be captured with frame cameras oriented towards a center of the scene. Paths may be scanned across objects in the scene with signal beams oriented towards the center of the scene. Events may be generated based on signal beams that are reflected by the objects and detected by event cameras oriented towards the center of the scene. Trajectories may be generated based on the paths and the events. A scene that includes a representation of the objects based on the captured two-dimensional video and the trajectories may be generated such that a position and an orientation of the represented objects in the scene are based on the trajectories.

36 Claims, 18 Drawing Sheets

(56) References Cited

U.S. PATENT DOCUMENTS

| | | | |
|---|---|---|---|
| 2016/0180574 A1 | 6/2016 | Kaminitz et al. | |
| 2016/0259168 A1 | 9/2016 | Katz et al. | |
| 2017/0176575 A1 | 6/2017 | Smits | |
| 2019/0128665 A1 | 5/2019 | Harendt | |
| 2019/0213309 A1 | 7/2019 | Morestin et al. | |
| 2019/0279379 A1 | 9/2019 | Srinivasan et al. | |
| 2021/0141094 A1 | 5/2021 | Russ et al. | |
| 2021/0304574 A1* | 9/2021 | Ramanathan | H04N 23/65 |
| 2022/0156998 A1 | 5/2022 | Lee et al. | |
| 2022/0287676 A1 | 9/2022 | Steines et al. | |
| 2023/0169683 A1* | 6/2023 | Paden | G01S 7/4808 348/139 |
| 2023/0230212 A1* | 7/2023 | García Capel | G06T 5/009 382/100 |

FOREIGN PATENT DOCUMENTS

| | | |
|---|---|---|
| CN | 112750168 A | 5/2021 |
| CN | 113313710 A | 8/2021 |
| JP | H06-94428 A | 4/1994 |
| JP | 2009-243986 A | 10/2009 |
| JP | 2018-195240 A | 12/2018 |
| JP | 2020-52719 A | 4/2020 |
| JP | 2020-64011 A | 4/2020 |
| JP | 2020-106475 A | 7/2020 |
| JP | 2021-167776 A | 10/2021 |
| WO | 2018000037 A1 | 1/2018 |
| WO | 2018125850 A1 | 7/2018 |
| WO | 2019189381 A1 | 10/2019 |
| WO | 2020080237 A1 | 4/2020 |
| WO | 2021039022 A1 | 3/2021 |
| WO | 2021140886 A1 | 7/2021 |
| WO | 2022132828 A1 | 6/2022 |

OTHER PUBLICATIONS

International Search Report and Written Opinion for International Patent Application No. PCT/US2023/013718 dated May 30, 2023, pp. 1-7.
Office Communication for U.S. Appl. No. 18/130,080 dated Jun. 20, 2023, pp. 1-36.
Office Communication for U.S. Appl. No. 17/895,489 dated Jul. 5, 2023, pp. 1-13.
International Search Report and Written Opinion for International Patent Application No. PCT/US2023/015227 dated Jun. 27, 2023, pp. 1-7.
International Search Report and Written Opinion for International Patent Application No. PCT/US2021/063399 dated Mar. 22, 2022, pp. 1-7.
International Search Report and Written Opinion for International Patent Application No. PCT/US2022/036006 dated Oct. 4, 2022, pp. 1-8.
International Search Report and Written Opinion for International Patent Application No. PCT/US2022/037299 dated Oct. 25, 2022, pp. 1-7.
International Search Report and Written Opinion for International Patent Application No. PCT/US2022/038724 dated Nov. 1, 2022, pp. 1-7.
International Search Report and Written Opinion for International Patent Application No. PCT/US2022/041520 dated Nov. 8, 2022, pp. 1-7.
Office Communication for U.S. Appl. No. 17/876,333 dated Feb. 21, 2023, pp. 1-22.
Office Communication for U.S. Appl. No. 17/876,333 dated Mar. 1, 2023, pp. 1-2.
International Search Report and Written Opinion for International Patent Application No. PCT/US2022/050626 dated Mar. 7, 2023, pp. 1-8.
International Search Report and Written Opinion for International Patent Application No. PCT/US2023/017271 dated Jul. 11, 2023, pp. 1-7.

* cited by examiner

STAGE STUDIO FOR IMMERSIVE 3-D VIDEO CAPTURE

CROSS-REFERENCE TO RELATED APPLICATION

This application is a Utility Patent application based on previously filed U.S. Provisional Patent Application U.S. Ser. No. 63/269,323 filed on Mar. 14, 2022, the benefit of the filing date of which is hereby claimed under 35 U.S.C. § 119(e), and the contents of which is further incorporated in entirety by reference.

TECHNICAL FIELD

The present invention relates generally to machine sensing or machine vision systems, and more particularly, but not exclusively, to stage studio for immersive 3-D video capture.

BACKGROUND

The state of the art in robotic vision is largely based on cameras where the input to the sensing system is two-dimensional (2D) arrays of pixels that encode the amount of light that each pixel received over an exposure period, or on depth capture technologies (e.g., Time-of-Flight (ToF) cameras, structured light cameras, LIDAR, RADAR, or stereo cameras, to name a few) which provide three-dimensional (3D) point clouds, where each point in the point cloud may store its position in space with respect to the vision system, and may store any of a number of other data associated with the patch of reflecting material that the point was generated from (e.g., brightness, color, relative radial velocity, spectral composition, to name a few). Note that 3D point clouds may be represented in "frames", similar in spirit to the frames of images from cameras, meaning that they don't have a fundamental representation of continuously evolving time.

To provide useful perception output that may be used by machine vision applications, such as, robotic planning and control systems, these 2D or 3D data often need to be processed by machine vision algorithms implemented in software or hardware. In some cases, some machine vision systems may employ machine learning to determine properties or features of the world that may be salient to particular robotic tasks, such as, the location, shape orientation, material properties, object classification, object motion, relative motion of the robotic system, or the like. In many cases, neither the 2D nor 3D representations employed by conventional machine vision systems provide inherent/native support for continuous surface representation of objects in the environment.

In some cases, scanning systems may employ multiple scanning sensors (e.g., image cameras, event cameras, or the like) to concurrently scan the same scenes or objects. In some cases, each sensor may independently collect scanning information based on the particular viewpoint of the sensor. Often it may be difficult for machine vision applications to efficiently or effectively determine if scanning information from different sensors represent the same points or objects in the scanned subject matter. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
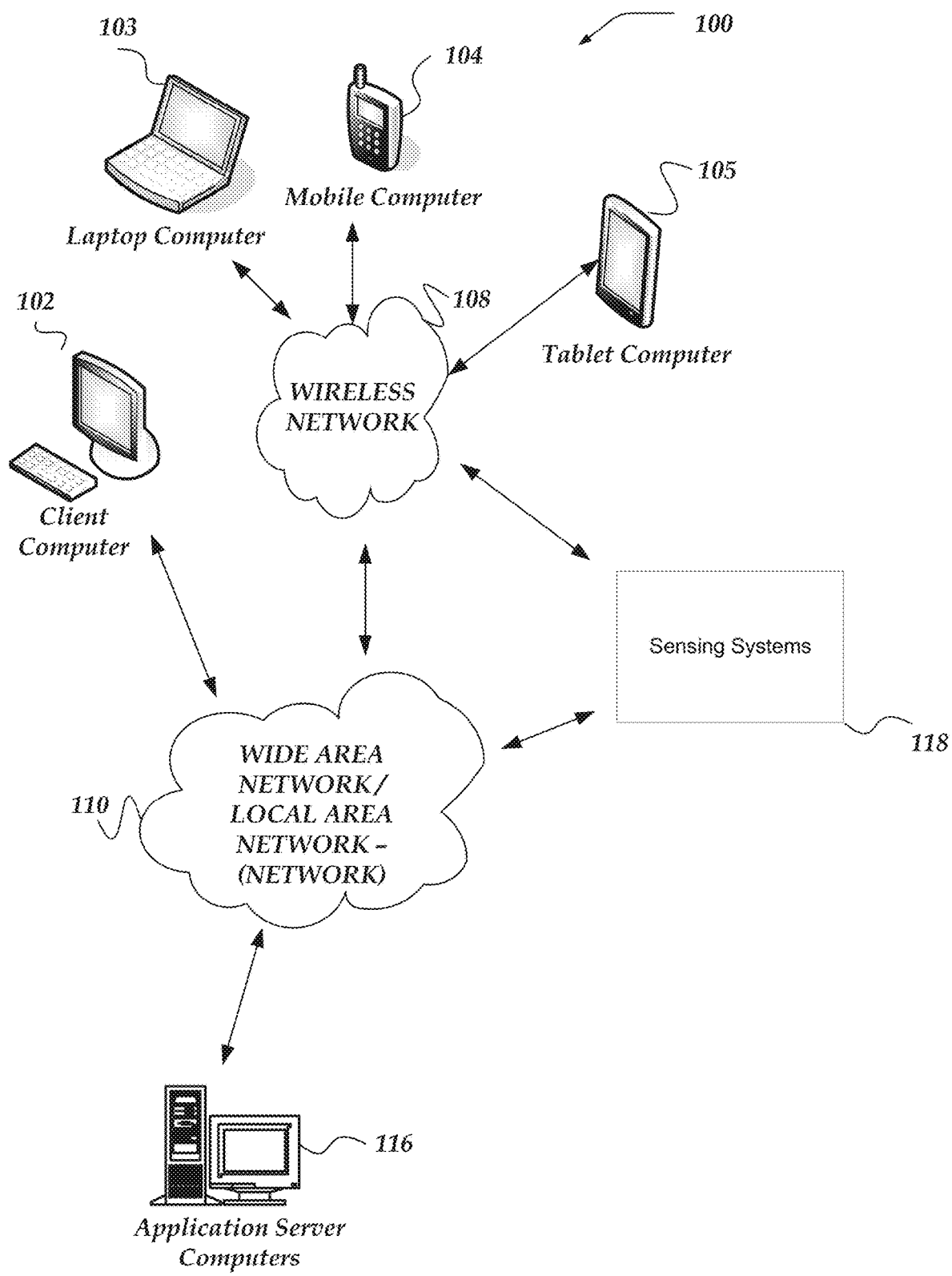
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "scanning signal generator," or "signal generator" refer to a system or a device that may produce a beam that may be scanned/directed to project into an environment. For example, scanning signal generators may be fast laser-based scanning devices based on dual axis microelectromechanical systems (MEMS) that are arranged to scan a laser in a defined area of interest. The characteristics of scanning signal generator may vary depending on the application or service environment. Scanning signal generators are not strictly limited to lasers or laser MEMS, other types of beam signal generators may be employed depending on the circumstances. Critical selection criteria for scanning signal generator characteristics may include beam width, beam dispersion, beam energy, wavelength(s), phase, or the like. Scanning signal generator may be selected such that they enable sufficiently precise energy reflections from scanned surfaces or scanned objects in the scanning environment of interest. The scanning signal generators may be designed to scan various frequencies, including up to 10s of kHz. The scanning signal generators may be controlled in a closed loop fashion with one or more processors that may provide feedback about objects in the environment and instructs the scanning signal generator to modify its amplitudes, frequencies, phase, or the like.

As used herein, the terms "event sensor, or" "event camera" refer to a device or system that detects reflected energy from scanning signal generators. Event sensors may be considered to comprise an array of detector cells that are responsive to energy reflected from scanning signal generators. Event sensors may provide outputs that indicate which detector cells are triggered and the time they are triggered. Event sensors may be considered to generate sensor outputs (events) that report the triggered cell location and time of detection for individual cells rather than being limited to reporting the state or status of every cell. For example, event sensors may include event sensor cameras, SPAD arrays, SiPM arrays, or the like.

As used herein the terms "image sensor," or "frame camera" refer to a device or system that can provide electronic scene information (electronic imaging) based on light or other energy collected at surface the image sensor. Conventionally, image sensors may be comprised of charge-coupled devices (CCDs) or complementary metal oxide semi-conductors (CMOS) devices. In some cases, image sensors may be referred to as frame capture cameras. Also, in some cases, image sensors may be deployed or otherwise used as to collect event information.

As used herein the terms "trajectory," "parametric trajectory," "surface trajectory" refers to one or more data structures that store or represent parametric representations of curve segments that may correspond to surfaces sensed by one or more sensors. Trajectories may include one or more attributes/elements that correspond to constants or coefficients of segments of one-dimensional analytical curves in three-dimensional space. Trajectories for a surface may be determined based on fitting or associating one or more sensor events to known analytical curves. Sensor events that are inconsistent with the analytical curves may be considered noise or otherwise excluded from trajectories.

As used herein the term "configuration information" refers to information that may include rule-based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed providing a stage studio for immersive 3-D video capture. In one or more of the various embodiments, a two-dimensional video of a scene may be captured with two or more frame cameras oriented towards a center of the scene.

In one or more of the various embodiments, a plurality of paths may be scanned across one or more objects in the scene with one or more signal beams oriented towards the center of the scene.

In one or more of the various embodiments, a plurality of events may be generated based on one or more signal beams that are reflected by the one or more objects and detected by one or more event cameras oriented towards the center of the scene.

In one or more of the various embodiments, a plurality of trajectories may be generated based on the plurality of paths and the plurality of events such that each trajectory is a parametric representation of a one-dimensional curve segment in a three-dimensional space.

In one or more of the various embodiments, a three-dimensional scene that includes a representation of the one or more objects based on the captured two-dimensional video and the plurality of trajectories may be generated such that a position and an orientation of the one or more represented objects in the scene are based on the plurality of trajectories.

In one or more of the various embodiments, the scene may be presented to one or more users with one or more of a hardware display, a virtual-reality display headset, or the like.

In one or more of the various embodiments, generating the scene may include: determining a position of the scene based on one or more positions of the two or more frame cameras, one or more other positions of the one or more event cameras, an orientation of the two or more frame cameras, and another orientation of the one or more event cameras such that a portion of the scene that is outside the scene is an external scene and another portion of the scene that is inside the scene is an internal scene; capturing two-dimensional video of the external scene employing the two or more frame cameras; scanning a plurality of other paths across one or more other objects in the external scene with the one or more signal beams; generating a plurality of other events based on one or more other signal beams that are reflected by the one or more other objects and detected by the one or more event cameras; generating a plurality of other trajectories based on the plurality of other paths and the plurality of other events; modifying the scene based on the two-dimensional video of the external scene and the plurality of other trajectories such that the modified scene incorporates a representation of the one or more other objects in the external scene; or the like.

In one or more of the various embodiments, the two or more frame cameras may be attached to a framework, e.g., a rigid interlocked framework, a semi-rigid framework, or a flexible framework, to fix a position of the two or more frame cameras around the center of the scene such that the framework may be comprised of rods or bars that encircle the scene to enable one or more frame cameras a view of one or more areas external to the scene. In some embodiments, one or more signal generators for the one or more signal beams attached to the framework to fix the position of the one or more signal beams around the center of the scene to enable the one or more signal beams to scan a plurality of other paths across one or more other objects in the one or more areas external to the scene. In some embodiments, the one or more event cameras may be attached to the framework to fix the position of the one or more event cameras around the center of the scene to generate a plurality of other events based on the signal beams reflected by the one or more other objects in the one or more areas external to the scene.

In one or more of the various embodiments, the two or more frame cameras may be attached to one or more vertically oriented poles to fix a position of the two or more frame cameras around the center of the scene such that the one or more poles are positioned around the scene to enable one or more frame cameras to view one or more areas external to the scene. In some embodiments, the one or more signal beam generators may be attached to the one or more vertically oriented poles to fix the position of the one or more signal beams around the center of the scene to enable the one or more signal beams to scan a plurality of other paths across one or more other objects in the one or more areas external to the scene such that the one or more signal beam generators generate the one or more signal beams. In some embodiments, the one or more event cameras may be attached to the one or more vertically oriented poles to fix the position of the one or more event cameras around the center of the scene to enable the generation of a plurality of other events based on the signal beams reflected by the one or more other objects in the one or more areas external to the scene.

In one or more of the various embodiments, the two or more frame cameras may be attached to one or more aerial drones such that the one or more flight capable drones are dynamically positioned around the scene. In some embodiments, one or more signal beam generators may be attached to the one or more aerial drones such that the one or more signal beam generators generate the one or more signal beams. In some embodiments, the one or more event cameras may be attached to the one or more aerial drones. And, in some embodiments, the scene updated based on a current position of the one or more aerial drones.

In one or more of the various embodiments, one or more of the two or more frame cameras, the one or more event cameras, or one or more signal beam generators may be positioned to provide one or more overlapped fields of view of the scene.

In one or more of the various embodiments, a position of the scene may be determined based on one or more predicted positions of the one or more objects. In some embodiments, one or more of the two or more frame cameras, the one or more event cameras, or one or more signal beam generators that generate the one or more signal beams may be positioned external to the scene.

In one or more of the various embodiments, two or more camera pods that each include a housing that encloses one or more frame cameras, one or more event cameras, and one or more signal beam generators may be provided. In some embodiments, the two or more camera pods may be employed to provide the two or more frame capture cameras, one or more signal beam generators, or the one or more event cameras.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs), such as, network 110, wireless network 108, client computers 102-105, application server computer 116, sensing systems 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, sensing systems 118, or other computers.

Client computers 102-105 may further be configured to include a client application that enables an end-user to log into an end-user account that may be managed by another computer, such as application server computer 116, sensing systems 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by sensing systems 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, sensing systems 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116 or sensing systems 118 are described in more detail below in conjunction with FIG. 3. Although FIG. 1 illustrates application server computer 116 and sensing systems 118 each as a single computer, the innovations or embodiments are not so limited. For example, one or more functions of application server computer 116, sensing systems 118, or the like, may be distributed across one or more distinct network computers. Moreover, in one or more embodiments, sensing systems 118 may be implemented using a plurality of network computers. Further, in one or more of the various embodiments, application server computer 116, sensing systems 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
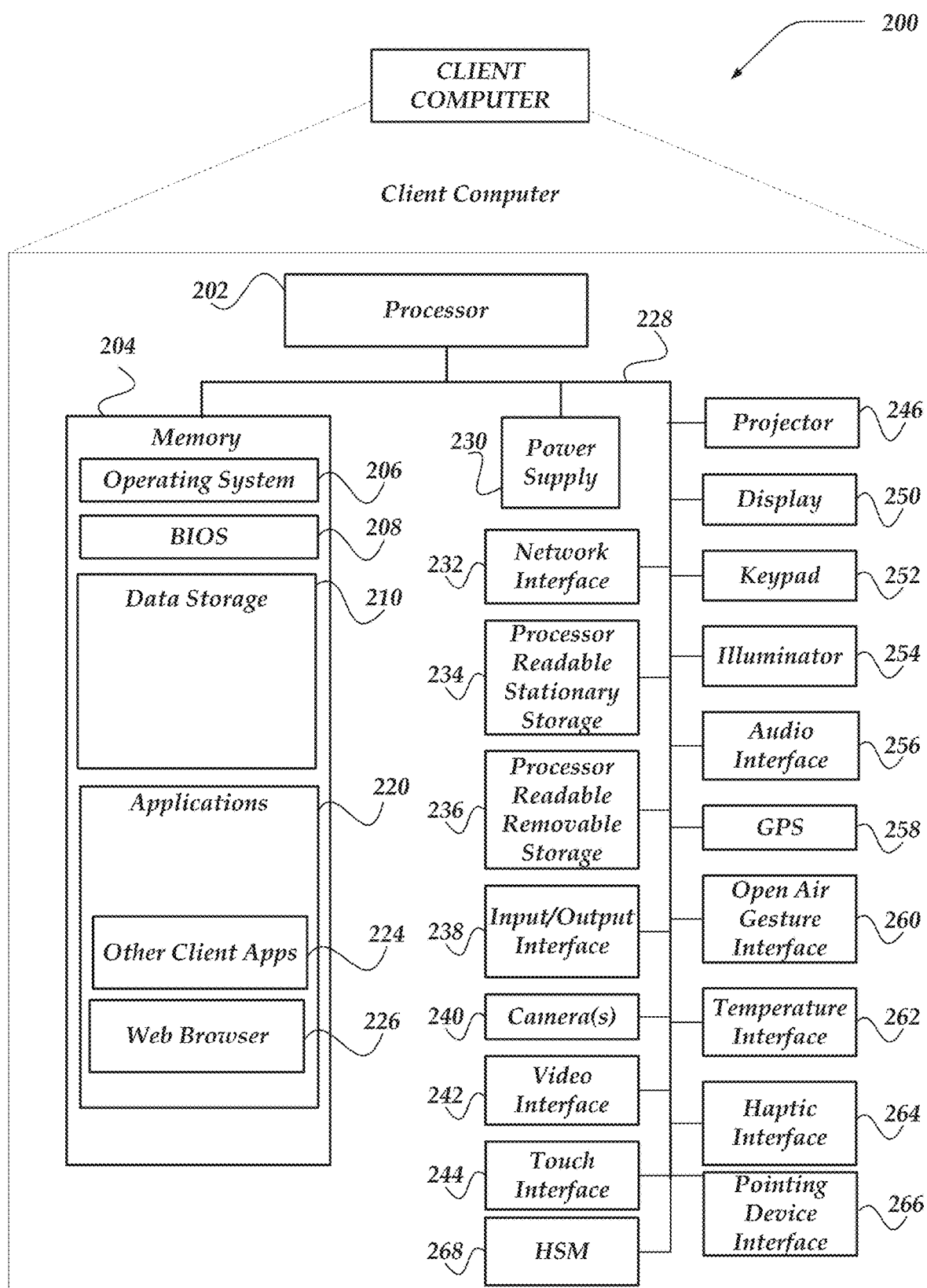
FIG. 2 illustrates a schematic embodiment of a client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in, file systems, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, sensor events, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
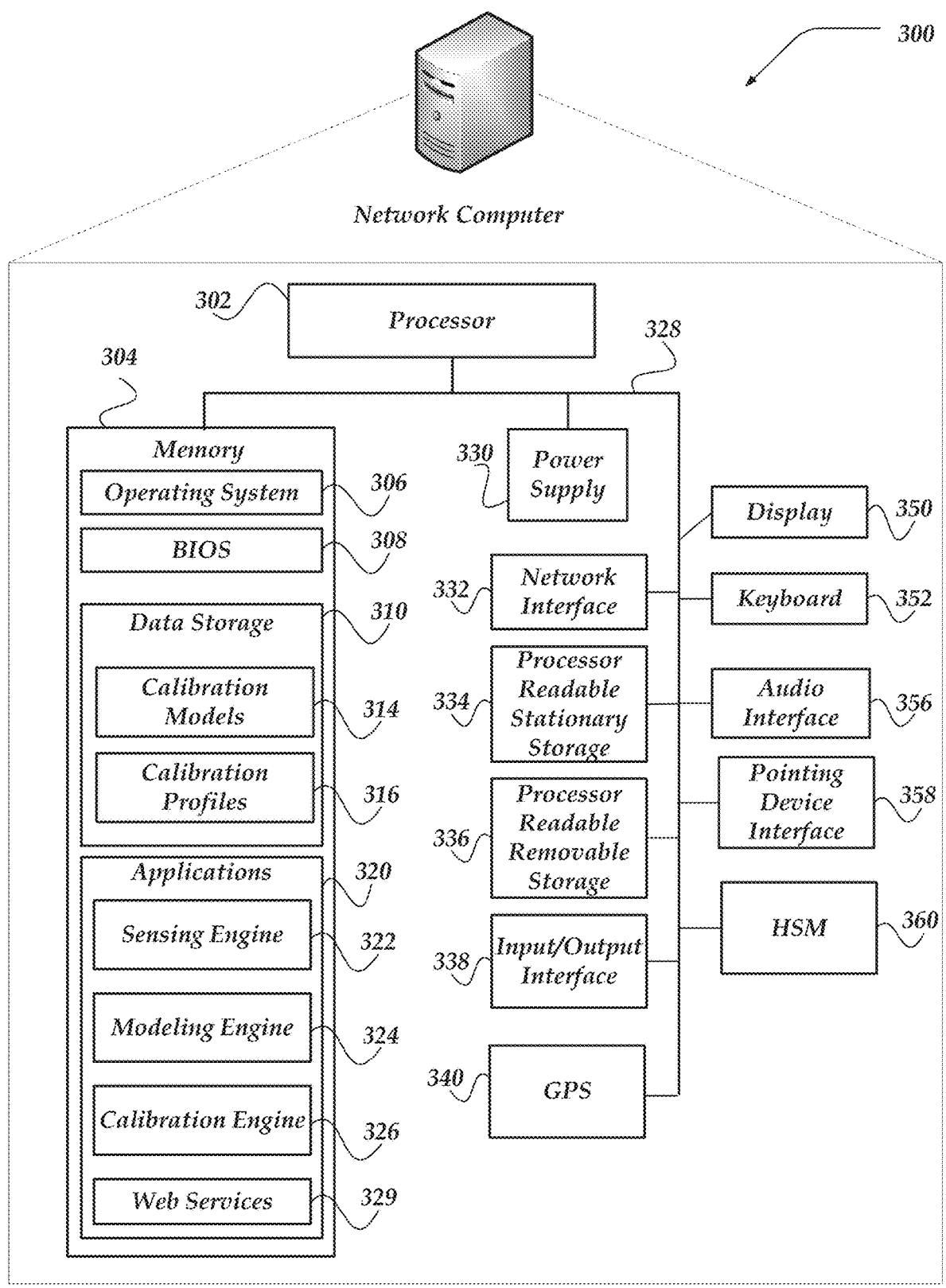
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or sensing systems 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, sensing engine 322, modeling engine 324, calibration engine 326, web services 329, or the like, may be arranged to employ geo-location information to select one or more localization features, such as, time zones, languages, currencies, currency formatting, calendar formatting, or the like. Localization features may be used in file systems, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, calibration models 314, calibration profiles 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include sensing engine 322, modeling engine 324, calibration engine 326, web services 329, or the like, which may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, sensing engine 322, modeling engine 324, calibration engine 326, web services 329, or the like, may be operative in a cloud-based computing environment. In one or more of the various embodiments, these applications, and others, which comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to sensing engine 322, modeling engine 324, calibration engine 326, web services 329, or the like, may be provisioned and de-commissioned automatically.

Also, in one or more of the various embodiments, sensing engine 322, modeling engine 324, calibration engine 326, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
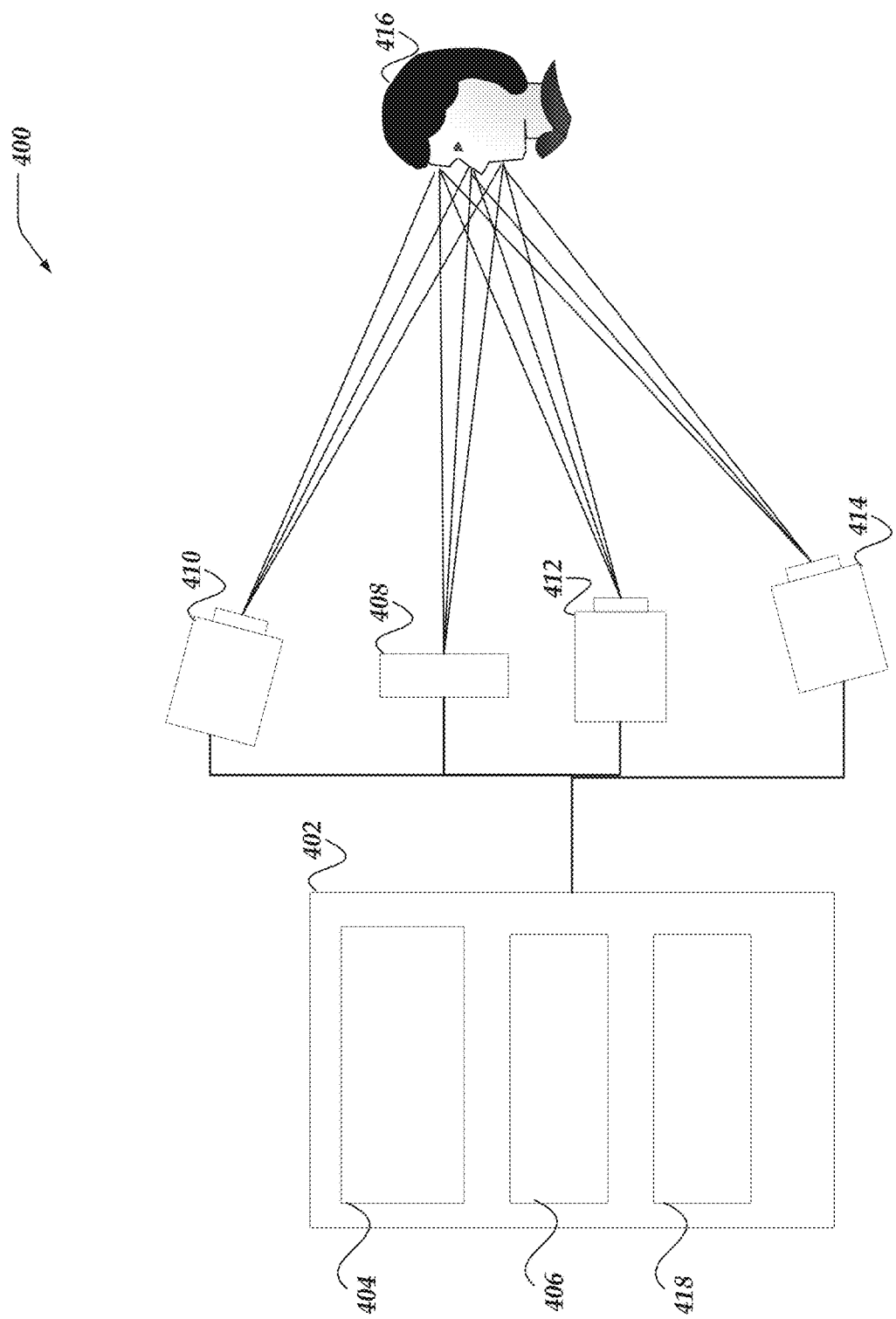
FIG. 4 illustrates a logical architecture of a system for a stage studio for immersive 3-D video capture in accordance with one or more of the various embodiments.

FIG. 4 illustrates a logical architecture of system 400 for a stage studio for immersive 3-D video capture in accordance with one or more of the various embodiments.

In this example, for some embodiments, sensing systems, such as system 400 may include one or more servers, such as sensing server 402. In some embodiments, sensing servers may be arranged to include: one or more sensing engines, such as, sensing engine 404; one or more modeling engines, such as, modeling engine 406; one or more calibration engines, such as, calibration engine 418.

Also, in some embodiments, sensing systems may include one or more signal generators that may at least generate sensor information based on where the energy from the signal generator reflects from a surface. In this example, for some embodiments, signal generator 408 may be considered to be a laser scanning system. Further, in some embodiments, sensing systems may include one or more event sensors that generate events based on the reflected signal energy (e.g., laser beam paths). Also, in some embodiments, sensing systems may include one or more image sensors that may be configured to capture scene information, reflected signal energy, or the like. In this example, for some embodiments, the sensors may be arranged to generate sensor information that corresponds to the reflected signal energy. In this example, the sensors may include event sensor 410, event sensor 412, and event sensor 414.

Accordingly, in some embodiments, the 2D sensor information from each sensor may be provided to a sensing engine, such as, sensing engine 404. In some embodiments, sensing engines may be arranged to synthesize the 2D points provided by the sensors into 3D points based on triangulation, or the like.

Further, in some embodiments, sensing engines may be arranged to direct the signal generator (e.g., scanning laser 408) to follow one or more patterns based on one or more path-functions. Thus, in some embodiments, signal generators may scan the one or more objects or surface area using a known and precise scanning path that may be defined or described using one or more functions that correspond to the curve/path of the scanning.

Accordingly, in some embodiments, sensing engines may be arranged to synthesize information about the objects or surfaces scanned by the signal generator based on the 3D sensor information provided by the sensors and the known scanning curve pattern.

In some embodiments, scanning signal generator 408 may be implemented using one or more fast laser scanning devices, such as a dual-axis MEMS mirror that scans a laser beam. In some embodiments, the wavelength of the laser may be in a broad range from the UV into the IR. In some embodiments, scanning signal generators may be designed to scan up to frequencies of 10s of kHz. In some embodiments, scanning signal generators may be controlled in a closed loop fashion using one or more processors that may provide feedback about the objects in the environment and instruct the scanning signal generator to adapt one or more of amplitude, frequency, phase, or the like. In some cases, for some embodiments, scanning signal generators may be arranged to periodically switch on and off, such as, at points if the scanner may be slowing before changing direction or reversing direction.

In some embodiments, system 400 may include one or more event sensors, such as, event sensor 410, event sensor 412, or the like. In some embodiments, event sensors may comprise arrays of pixels or cells that are responsive to reflected signal energy. In some embodiment, event sensors may be arranged such that some or all of the event sensors share a portion of their fields of view with one another and with the scanning signal generator. Further, in some embodiments, the relative position and poses of each sensor may be known. Also, in some embodiments, each event sensor may employ synchronized clocks. For example, in some embodiments, event sensors may be time synchronized by using a clock of one event sensor as the master clock or by using an external source that periodically sends a synchronizing signal to the event sensors. Alternatively, in some embodiments, sensors may be arranged to provide events to sensing engines independently or asynchronously of each other. In some embodiments, scanning event cameras may be employed as sensors.

Also, in some embodiments, system 400 may include one or more image sensors (not shown). In some embodiments, image sensors may be configured to capture one or more frames or images of the scene being sensed. In some embodiments, the captured images may include some or all of the same surface/objects being scanned by the signal generator.

Accordingly, as a beam from the scanning signal generator beam scans across the scene, the event sensors sense reflected signal energy (e.g., photons/light from lasers) and trigger events based on their cells/pixels that detect reflected signal energy in the scene. Accordingly, in some embodiments, each event (e.g., sensor event) generated by an event sensor may be determined based on cell location and a timestamp based on where and when the reflected energy is detected in each sensor. Thus, in some embodiments, each event sensor may report each sensor event independently as it is detected rather than collecting information/signal from the entire sensor array before providing the sensor event. This behavior may be considered distinguishable from image sensors that may include pixel arrays or CCDs which may 'raster scan' the entire array of cells before outputting signal data in the form of frame or images. In contrast, event sensors, such as, event sensor 410, event sensor 412, or the like, may immediately and continuously report signals (if any) from individual cells. Accordingly, the cells in an individual event sensor do not share a collective exposure time rather each cell reports its own detected events. Accordingly, in some embodiments, sensors, such as, event sensor 410, event sensor 412, or the like, may be based on event sensor cameras, single photon avalanche diode (SPAD) sensors, silicon photo-multipliers (SiPM) arrays, or the like.

Also, in some embodiments, in conjunction with events from event sensors, sensing system 400 may collect images from one or more image sensors, such as, image sensor 414. Accordingly, in one or more of the various embodiments, images may represent a snapshot in time of the scene being scanned.

Figure 5:
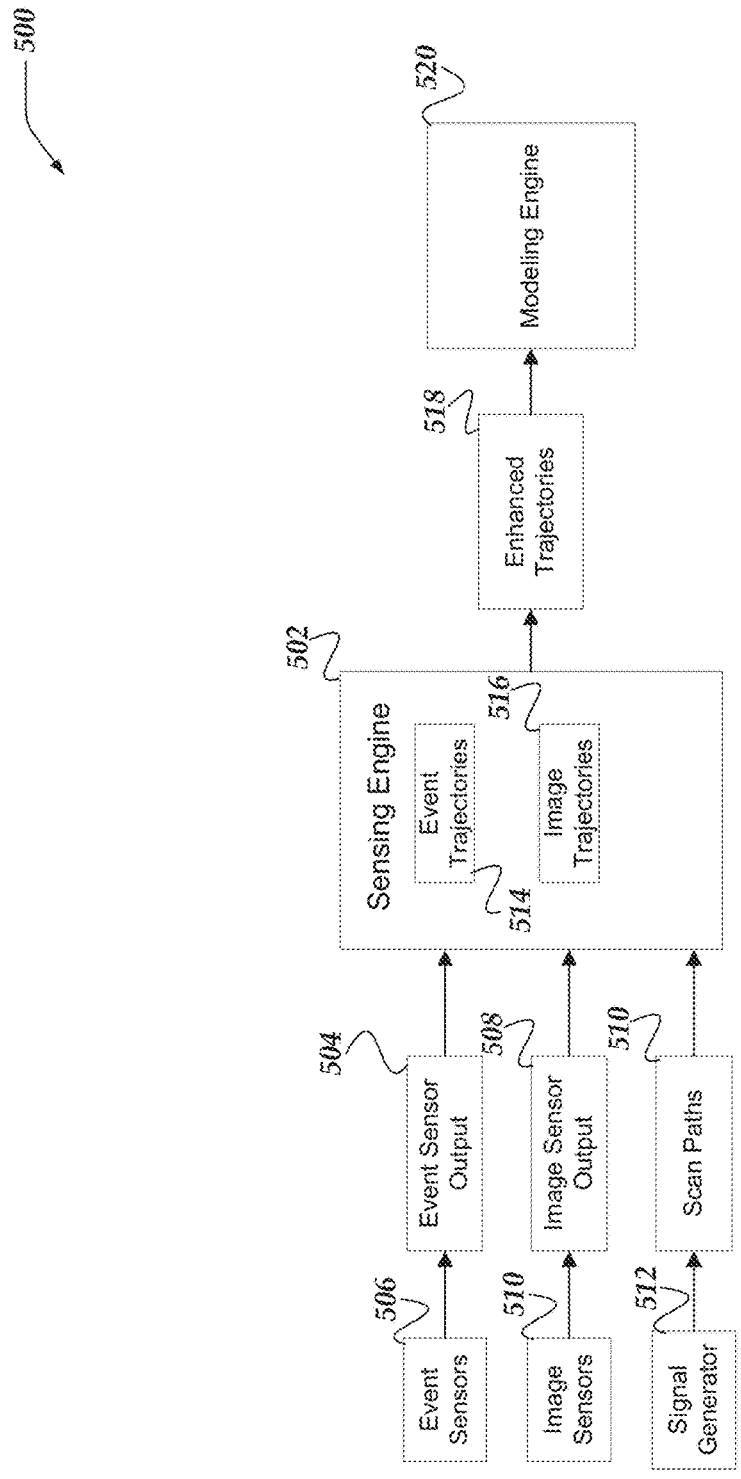
FIG. 5 illustrates a logical schematic of a system for a stage studio for immersive 3-D video capture in accordance with one or more of the various embodiments.

FIG. 5 illustrates a logical schematic of system 500 for a stage studio for immersive 3-D video capture in accordance with one or more of the various embodiments. In some embodiments, sensing engines, such as, sensing engine 502 may be arranged to be provided sensor outputs from one or more event sensors or one or more image sensors. In some embodiments, sensors outputs from event sensors may include information, such as, event hit location, pixel location, event timestamps, or the like, that may be associated with sensor events. Also, in some embodiments, sensor outputs may include images, frames, or the like, captured by image sensors. As described above, in some embodiments, signal generators, such as, scanning lasers may scan an area of interest such that reflections of the energy may be collected by one or more event sensors and one or more image sensors. Accordingly, in some embodiments, information from each sensor may be provided to sensing engine 502.

Also, in some embodiments, sensing engine 502 may be provided a scanning path that corresponds to the scanning path of the scanning signal generator. Accordingly, in some embodiments, sensing engine 502 may employ the scanning path to determine the path that the scanning signal generator traverses to scan the area of interest.

Accordingly, in some embodiments, sensing engine 502 may be arranged to recognize sensor events that may correspond to a surface location in three-dimensions based on the sensor output. For example, if there may be one or more sensors, the sensing engine may employ triangulation to compute the location in the area of interest where the scanning signal energy was reflected. One of ordinary skill in the art will appreciate that triangulation or other similar techniques may be applied to determine the scanned location if the position of the sensors is known.

In some embodiments, scanning signal generators (e.g., fast scanning lasers) may be configured to execute a precision scanning pattern. Accordingly, in some embodiments, sensing engine 502 may be provided the particular scanning path function. Also, in some embodiments, sensing engine 502 may be arranged to determine the particular scanning path based on configuration information to account for local circumstances of local requirements.

In one or more of the various embodiments, sensing engines, such as, sensing engine 502 may generate a sequence of surface trajectories that may be based on the scan path and the sensor information synthesized from the sensor output 504.

Figure 6:
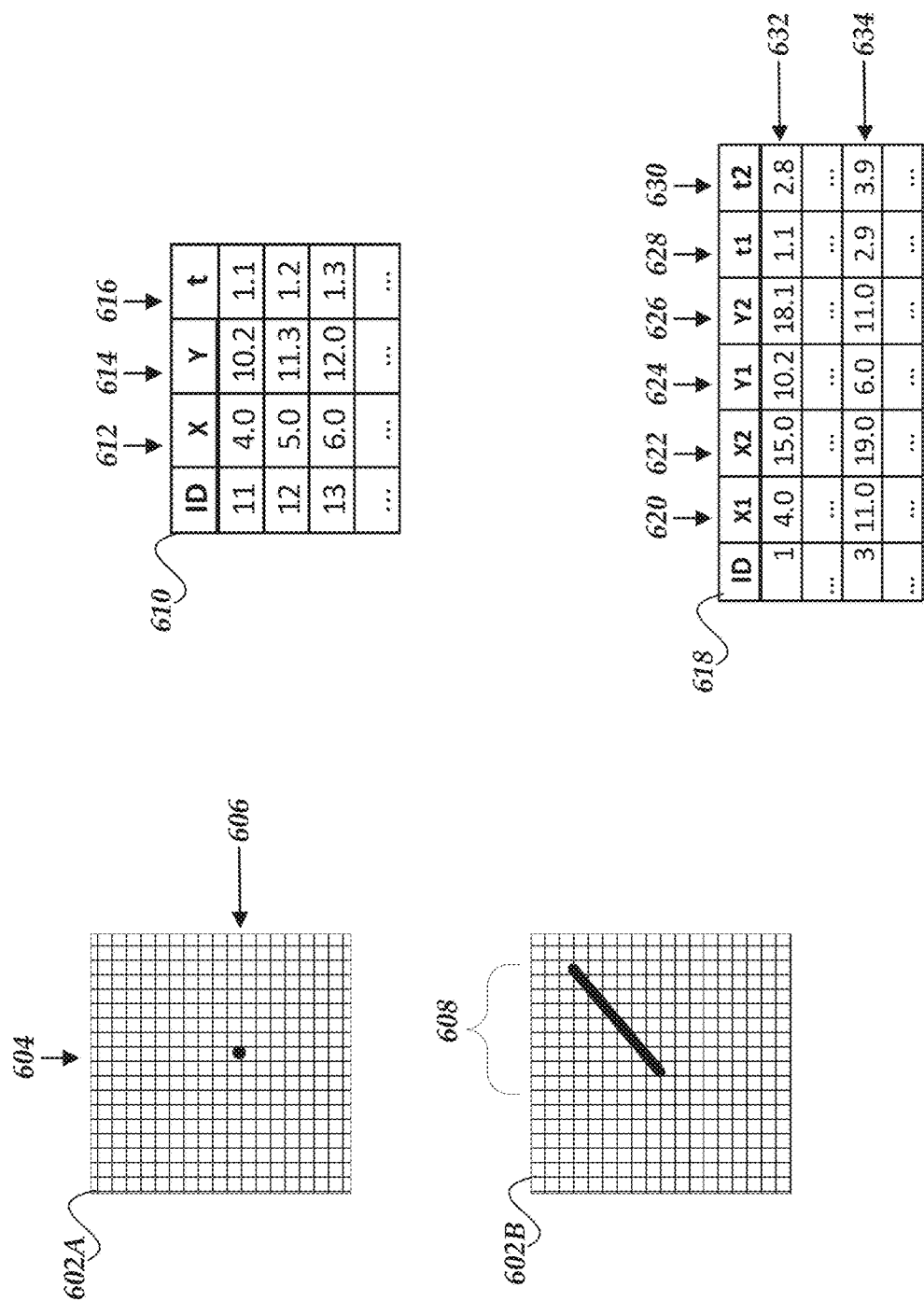
FIG. 6 illustrates a logical representation of sensors and sensor output information for a stage studio for immersive 3-D video capture in accordance with one or more of the various embodiments.

FIG. 6 illustrates a logical representation of sensors and sensor output information for a stage studio for immersive 3-D video capture in accordance with one or more of the various embodiments.

In one or more of the various embodiments, sensing engines may be provided sensor output from various sensors. In this example, for some embodiments, sensor 602A may be considered to represent a generic sensor that may emit signals that correspond to the precise location on the sensor where reflected energy from the scanning signal generator may be detected. For example, sensor 602A may be considered an array of detector cells that reports the cell location of the cell that has detected energy reflected from the scanning signal generator. In this example, horizontal location 604 and vertical location 606 may be considered to represent a location corresponding to the location in sensor 602 where reflected signal energy has been detected.

In one or more of the various embodiments, sensing engines may be arranged to receive sensor information for one or more detection events from one or more sensors. Accordingly, in some embodiments, sensing engines may be arranged to determine additional information about the source of the reflected energy (beam location on scanned surface) based on triangulation or other methods. In some embodiments, if sensing engines employs triangulation or other methods to locate the location of the signal beam in the scanning environment, the combined sensor information may be considered a single sensor event comprising a horizontal (x) location, vertical location (y) and time component (t). Also, in some embodiments, sensor event may include other information, such as, time-of-flight information depending on the type or capability of the sensors.

Further, as described above, the scanning signal generator (e.g., scanning laser) may be configured to traverse a precise path/curve (e.g., scanning path). Accordingly, in some embodiments, the pattern or sequence of cells in the sensors that detect reflected energy will follow a path/curve that is related to the path/curve of the scanning signal generator. Accordingly, in some embodiments, if the signal generator scans a particular path/curve a related path/curve of activated cells in the sensors may be detected. Thus, in this example, for some embodiments, path 608 may represent a sequence of cells in sensor 602B that have detected reflected energy from the scanning signal generator.

In one or more of the various embodiments, sensing engines may be arranged to fit sensor events to the scanning path curve. Accordingly, in one or more of the various embodiments, sensing engines may be arranged to predict where sensor events should occur based on the scanning path curve to determine information about the location or orientation of scanned surfaces or objects. Thus, in some embodiments, if sensing engines receive sensor events that are unassociated with the known scanning path curve, sensing engines may be arranged to perform various actions, such as, closing the current trajectory and beginning a new trajectory, discarding the sensor event as noise, or the like.

In one or more of the various embodiments, scanning path curves may be configured in advance within the limits or constraints of the scanning signal generator and the sensors. For example, a scanning signal generator may be configured or directed to scan the scanning environment using various curves including Lissajous curves, 2D lines, or the like. In some cases, scanning path curves may be considered piecewise functions in that they may change direction or shape at different parts of the scan. For example, a 2D line scan path may be configured to change direction if the edge of the scanning environment (e.g., field-of-view) is approached.

One of ordinary skill in the art will appreciate that if an unobstructed surface is scanned, the scanning frequency, scanning path, and sensor response frequency may determine if the sensor detection path appears as a continuous path. Thus, the operational requirements of the scanning signal generator, sensor precision, sensor response frequency, or the like, may vary depending on application of the system. For example, if the scanning environment may be relatively low featured and static, the sensors may have a lower response time because the scanned environment is not changing very fast. Also, for example, if the scanning environment is dynamic or includes more features of interest, the sensors may require increased responsiveness or precision to accurately capture the paths of the reflected signal energy. Further, in some embodiments, the characteristics of the scanning signal generator may vary depending on the scanning environment. For example, if lasers are used for the scanning signal generator, the energy level, wavelength, phase, beam width, or the like, may be tuned to suit the environment.

In one or more of the various embodiments, sensing engines may be provided sensor output as a continuous stream of sensor events or sensor information that identifies the cell location in the sensor cell-array and a timestamp that corresponds to when the detection event occurred.

In this example, for some embodiments, data structure 610 may be considered a data structure for representing sensor events based on sensor output provided to a sensing engine. In this example, column 612 represents the horizontal position of the location in the scanning environment, column 614 represents a vertical position in the scanning environment, and column 616 represents the time of the event. Accordingly, in some embodiments, sensing engines may be arranged to determine which (if any) sensor events should be associated with a trajectory. In some embodiments, sensing engines may be arranged to associate sensor events with existing trajectories or create new trajectories. In some embodiments, if the sensor events fit an expected/predicted curve as determined based on the scanning path curve, sensing engines may be arranged to associate the sensor events with an existing trajectory or create a new trajectory. Also, in some cases, for some embodiments, sensing engines may be arranged to determine one or more sensor event as noise if their location deviates from a predicted path beyond a defined threshold value.

In one or more of the various embodiments, sensing engines may be arranged to determine sensor events for each individual sensor rather being limited to provide sensor events computed based on outputs from multiple sensors. For example, in some embodiments, sensing engines may be arranged to provide a data structure similar to data structure 610 to collect sensor events for individual sensors.

In some embodiments, sensing engines may be arranged to generate a sequence of trajectories that correspond to the reflected energy/signal paths detected by the sensors. In some embodiments, sensing engines may be arranged to employ one or more data structures, such as, data structure 618 to represent a trajectory that may be determined based on the information captured by the sensors. In this example, data structure 610 may be table-like structure that includes columns, such as, column 620 for storing a first x-position, column 622 for storing a second x-position, column 624 for storing a first y-position, column 626 for storing a second y-position, column 628 for storing the beginning time of a trajectory, column 630 for storing an end time of a trajectory, of the like.

In this example, row 632 represents information for a first trajectory and row 634 represents information for another trajectory. As described herein, sensing engines may be arranged to employ one or more rules or heuristics to determine if one trajectory ends and another begins. In some embodiments, such heuristics may include observing the occurrence sensor events that are geometrically close or temporally close. Note, the particular components or elements of a trajectory may vary depending on the parametric representation of the analytical curve or the type of analytical curve associated with the scanning path and the shape or orientation of the scanned surfaces. Accordingly, one of ordinary skill in the art will appreciate that different types of analytical curves or curve representations may result in more or fewer parameters for each trajectory. Thus, in some embodiments, sensing engines may be arranged to determine the specific parameters for trajectories based on rules, templates, libraries, or the like, provided via configuration information to account for local circumstances or local requirements.

In one or more of the various embodiments, trajectories may be represented using curve parameters rather than a collection of individual points or pixels. Accordingly, in some embodiments, sensing engines may be arranged to employ one or more numerical methods to continuously fit sequences of sensor events to scanning path curves.

Further, in some embodiments, sensing engines may be arranged to employ one or more smoothing methods to improve the accuracy of trajectories or trajectory fitting. For example, in some embodiments, the scanning curve may be comprised of sensor events triggered by a scanning laser that may not be one cell wide because in some cases reflected energy may splash to neighboring cells or land on the border of two or more cells. Accordingly, in some embodiments, to better estimate the real position of the reflected signal beam as it traverses the sensor plane, sensing engines may be arranged to perform an online smoothing estimate, e.g., using a Kalman filter to predict a position in a trajectory in fractional units of detector cell position and fractional units of the fundamental timestamp of the sensor. Also, in some embodiments, sensing engines may be arranged to employ a batch-based optimization routine such as weighted least squares to fit a smooth curve to continuous segments of the scanning trajectory, which may correspond to when the scanning signal generator beam was scanning over a continuous surface.

Also, in some embodiments, the scanning path may be employed to determine if trajectories begin or end. For example, if the scanning path reaches an edge of a scanning area and changes direction, in some cases, a current trajectory may be terminated while a new trajectory may be started to begin capturing information based on the new direction of the scan. Also, in some embodiments, objects or other features that occlude or obstruct scanning energy or reflected scanning energy may result in breaks in the sensor output that introduce gaps or other discontinuities that may trigger a trajectory to be closed and another trajectory to be opened subsequent to the break or gap. Further, in some embodiments, sensing engines may be configured to have a maximum length of trajectories such that a trajectory may be closed if it has collected enough sensor events or enough time has elapsed from the start of the trajectory.

Also, in some embodiments, sensing engines may be arranged to determine trajectories for individual sensor. Accordingly, in some embodiments, sensing engines may be arranged to provide data structures similar to data structure 618 for each sensor.

Figure 7:
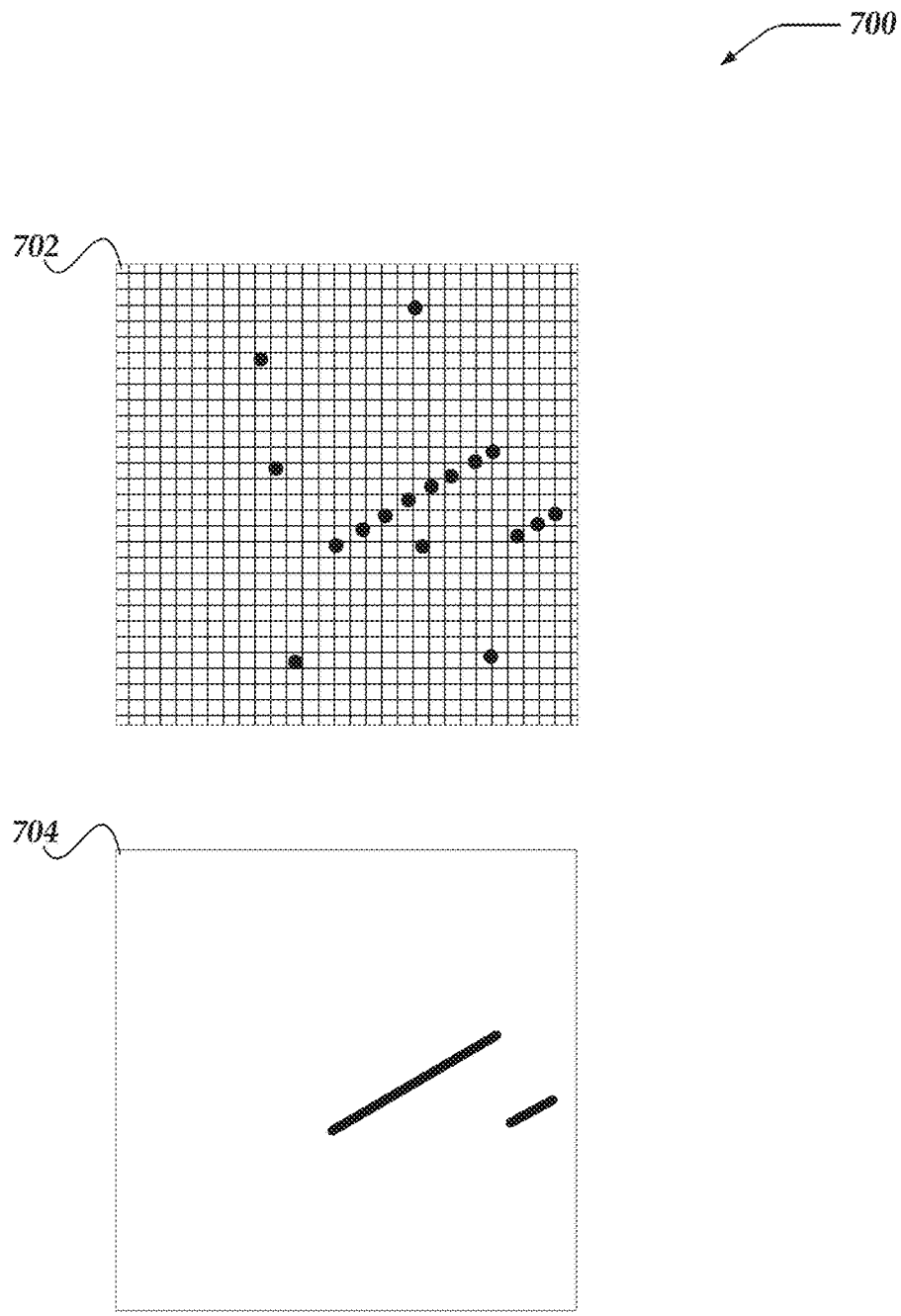
FIG. 7 illustrates a logical schematic of a system for a stage studio for immersive 3-D video capture in accordance with one or more of the various embodiments.

FIG. 7 illustrates a logical schematic of system 700 for a stage studio for immersive 3-D video capture in accordance with one or more of the various embodiments. As described above, in some embodiments, scanning signal generators may scan for surfaces in scanning environments. In some cases, conditions of the scanning environment or characteristics of the scanned surfaces may result in one or more spurious sensor events (e.g., noise) generated by one or more sensors. For example, sensor view 702 represents a portion of sensor events that may be generated during a scan.

In conventional machine vision applications, one or more 2D filters may be applied to a captured video image, point clusters, or the like, to attempt to separate noise events from the signals of interest. In some cases, conventional 2D image-based filters may be disadvantageous because they may employ one or more filters (e.g., weighted moving averaging, Gaussian filters, or the like) that may rely on statistical evaluation of pixel color/weight, pixel color/weight gradients, pixel distribution/clustering, or the like. Accordingly, in some cases, conventional 2D image filtering may be inherently fuzzy and highly dependent on application/environmental assumptions. Also, in some cases, conventional noise detection/noise reduction methods may erroneously miss some noise events while at the same time misclassifying one or more scene events as noise.

In contrast, in some embodiments, sensing engines may be arranged to associate sensor events into trajectories based on precise heuristics, such as, nearness in time and location that may be used to fit sensor events to analytical curves that may be predicted based on the scanning path. Because scanning paths are defined in advance, sensing engines may be arranged to predict which sensor events should be included in the same trajectory. See, trajectory view 704.

Further, in some embodiments, if surface or object features create gaps or breaks in trajectories, sensing engines may be arranged to close the current trajectory and start a new trajectory as soon as one may be recognized.

Also, in some embodiments, sensing engines may be arranged to determine trajectories directly from sensor events having the form (x, y, t) rather than employing fuzzy pattern matching or pattern recognition methods. Thus, in some embodiments, sensing engines may be arranged to accurately compute distance, direction, or the like, rather than relying fuzzy machine vision methods to distinguish noise from sensor events that should be in the same trajectory.

In one or more of the various embodiments, calibration engines may be arranged to employ rules, instructions, heuristics, or the like, for classifying sensor events as noise that may be provided via configuration information to account for local requirements or local circumstances that may be associated with a sensing applications or sensors.

Figure 8A:
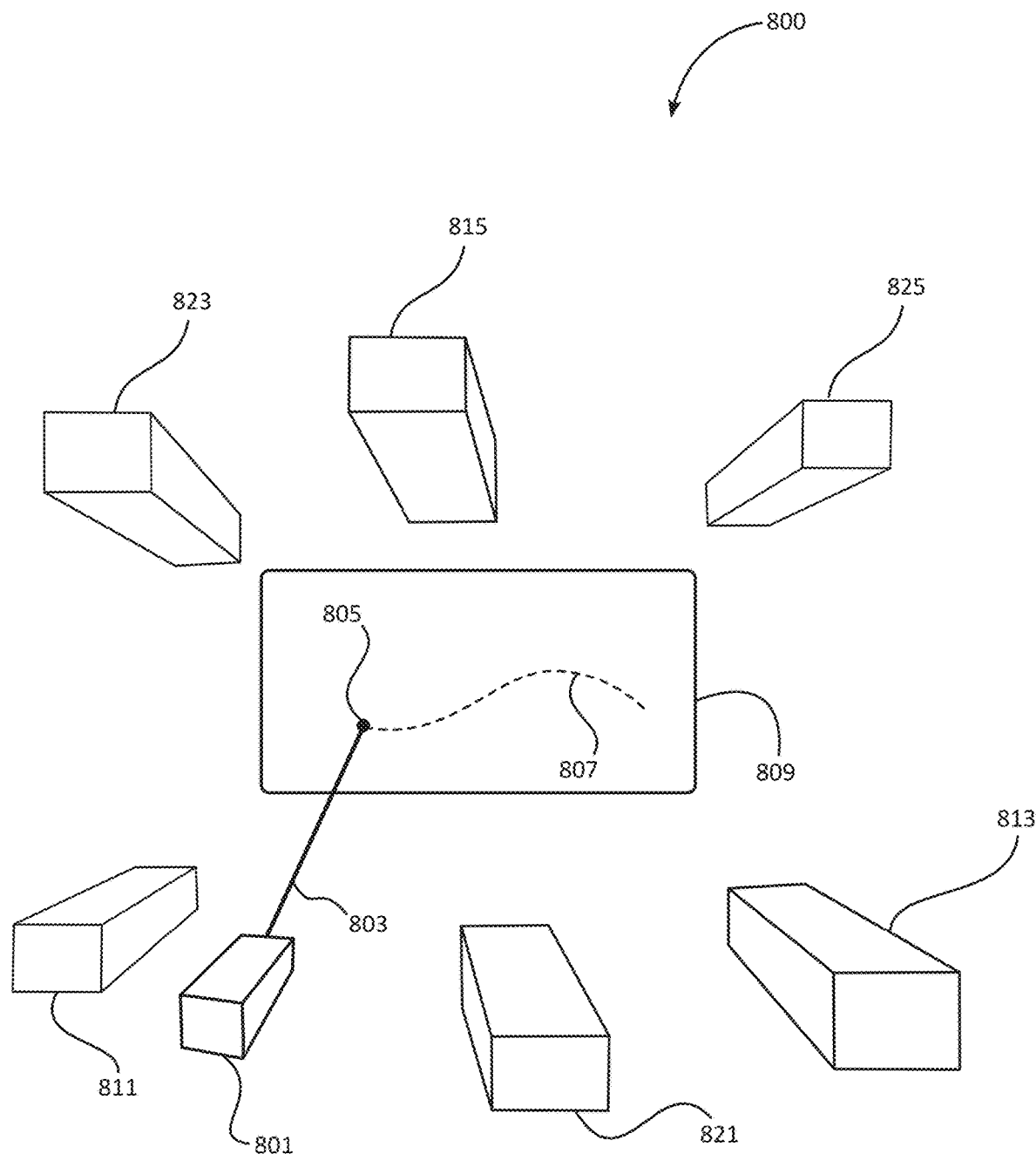
FIG. 8A illustrates an embodiment of a multi-camera system capable of 3D capture of a scene including video streams in accordance with one or more of the various embodiments.

FIG. 8A illustrates an embodiment of a multi-camera system 800 capable of 3D capture of a scene including video streams as well as object positions. In this example, for some embodiments, laser 801 may be configured to scan patterns across the scene, in this case across object 809. In this example, beam 803 scans spot 805 by tracing trajectory 807 across the object or objects in the scene. In this example, for some embodiments, cameras 811, 813, and 815 may be standard frame capture cameras imaging the scene. In this example, cameras 821, 823, and 825 may be event cameras capturing the same scene. In some embodiments, event cameras may trigger on light level differences at a pixel level. Accordingly, in some embodiments, one or more pixels may trigger up to the event camera time resolution, which may be as fast as 1 microsecond. In some embodiments, faster times may be possible if the event camera may be based on a SPAD (single photon avalanche photodiode) sensor array, or the like. This example shows three frame capture cameras and three event cameras, but other configurations may be possible. In some embodiments, there may be one or more event cameras in the system, as well as one or more frame capture cameras. In some embodiments, cameras may be configured such that there may be substantial overlap in the fields of views of one or more cameras with other cameras. In some embodiments, some of the cameras may only have overlap of fields of view with a subset of the other cameras in the system. In some embodiments, multiple beams may be scanned across the objects in the fields of view of the cameras simultaneously from one or more lasers, either at the same location as laser 801 or from different locations. In some embodiments, event cameras may capture light changes directly from ambient light changes in the scene, but typically they may be configured with sensitivity thresholds such that their primary source of data for light changes comes from the scanned beams. System 800 shows separate event cameras and frame capture cameras, but in an embodiment, frame capture cameras and event cameras may be substantially co-located, where their optical centers may be placed close together spatially.

In some embodiments, frame capture cameras, such as, frame capture cameras 811, 813, 815 may commonly capture video at a particular frame rate; the frame rates of the cameras may be substantially the same or they might be different from one another. In some embodiments, frame rates of the frame capture cameras may be synchronized or may operate out of phase with each other. In some embodiments, event cameras, such as, event cameras 821, 823, 825 may have pixels that may trigger independently at the clock speed of the cameras, and so frame rate may be not applicable to these cameras. In some embodiments, the combination of the event cameras and the scanning beam or beams may comprise a 3-D capture subsystem where events triggered by reflections or scattering from the various objects in the scene may be captured by the event cameras, which may be then assembled into trajectories across the scene which can then be used to calculate surface positions of all the scanned objects. In some embodiments, the combination of these two types of cameras into a single system may increase the capabilities of both subsystems. Frame capture cameras typically have a higher resolution than event cameras, but event cameras may capture data much quicker and with negligible latency as compared to frame capture cameras. In some embodiments, event cameras may be quickly calibrated with respect to one another by observing an arbitrary number of trajectories in the cameras. In this case, calibration may refer to not just determining the characteristics of each camera, but also determining to a scale the relative position and orientation of the event cameras. In some embodiments, scanned trajectories may also be visible to the frame capture cameras, in which case calibration of the position and orientation of the frame capture cameras may be calculated as well with respect to each other and the event cameras. In this case, the scanning beams may be bright enough that some or all of certain beam trajectories may be seen by the frame capture cameras, or in a variant, a higher power scanning beam could occasionally be used for calibration on a periodic basis for recalibration. In some embodiments, a variety of different wavelengths may be combined in the system, either in separate beams or combined into a single scanning beam; this might be used if event cameras and frame capture cameras may be sensitive to different wavelengths, or in some variants, more than one type of event camera could be used in the system. In some embodiments, frame capture cameras may be calibrated using objects or other fiducials in the scene.

In one or more of the various embodiments, if exact positions of frame capture cameras as well as their optical properties may be well-characterized, the process of combining data from video streams becomes more straightforward. In addition, knowledge of exact 3-D positions of the various objects and surfaces thereof may make this problem even more tractable. For example, in a system with a plurality of frame capture cameras, registration of objects among the various video streams may be extremely computationally challenging; objects across the scene may be constantly tracked and matched from various perspectives. Accordingly, in some cases, the search space for matching and registration of frames from video alone may be quite large and relies on accurate synchronization among cameras to reduce motion artifacts. Adding in data from the event camera subsystem about object positions and motion on a timescale much faster than video frame rates of the frame capture cameras reduces the pixel space to be searched by orders of magnitude. Because each pixel from frame capture cameras may be closely mapped to objects in 3-D space, the position where overlap between cameras may be constrained to a much smaller area.

Figure 8B:
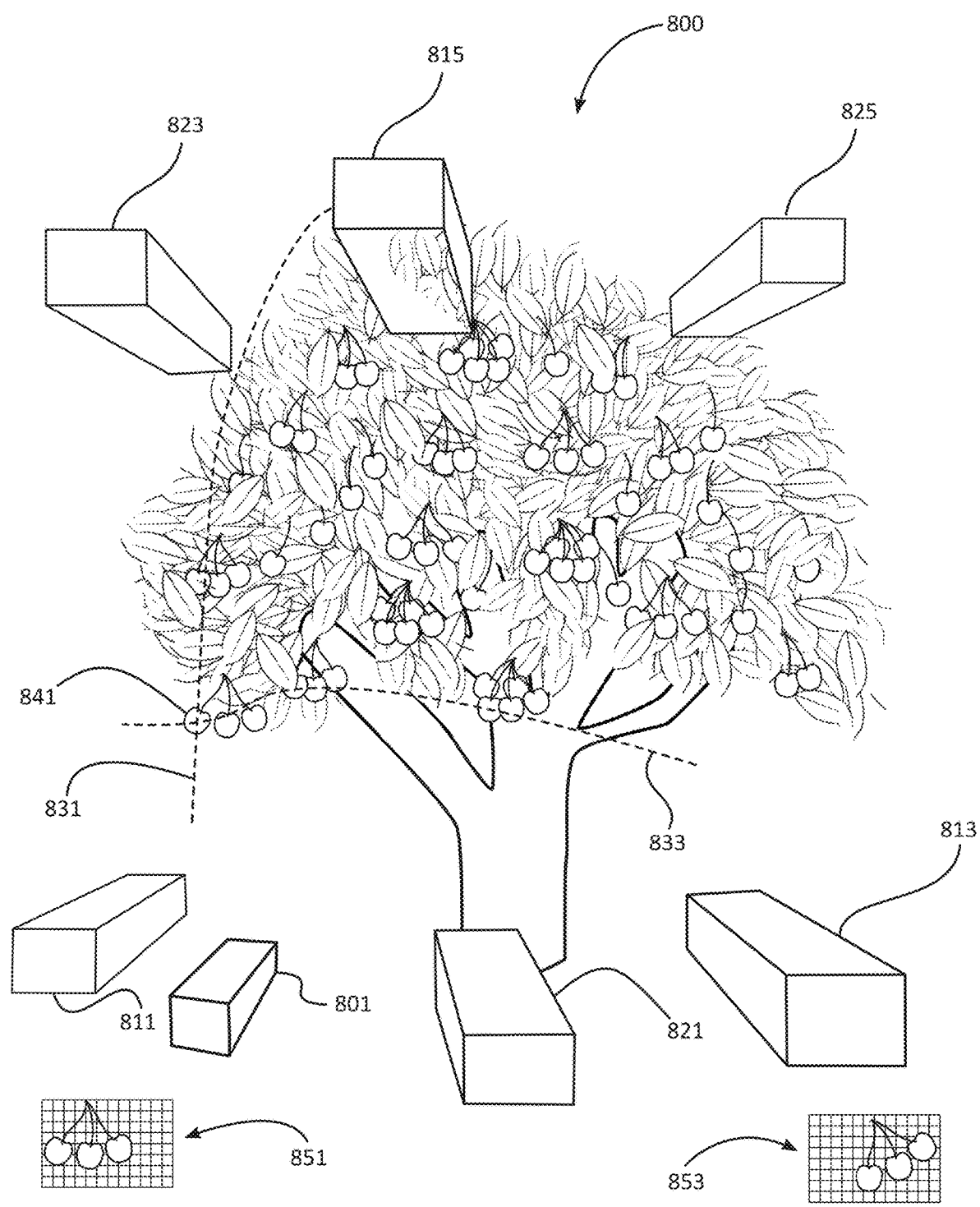
FIG. 8B shows a system for capturing a scene that includes a cherry tree in accordance with one or more of the various embodiments.

An example of this may be seen in FIG. 8B, which shows system 800 capturing a scene that includes a cherry tree. In this example, the tree has a number of cherries (e.g., cherries 841) on it, although many of cherries 841 may be obscured either partially or fully from the view of any of the cameras in the system. In some embodiments, frame capture cameras may see finer details than the event cameras, including detailed color information, which might be useful, for instance, in choosing which cherries to pick if system 800 were mounted on a picking robot. In some embodiments, event cameras and lasers may capture accurate positions of many details on the tree, including the surface shapes and positions of all the objects using numerous beams that quickly scan all objects; trajectory 831 and trajectory 833 represent two trajectories over the scene that may that cross on a specific cherry 841 (e.g., cherries 841) but scan rates may be high enough to completely cover the scene quickly. In some cases, accurate registration of the scene with frame capture cameras, as mentioned before, may be difficult, but may become even harder in a scene such as this, where there may be many objects with similar shapes and colors. For example, a scene with many cherries appearing at each frame simultaneously may appear indistinguishable even to sophisticated algorithms. However, in some embodiments, the 3-D surface model generated by the event cameras may provide a more accurate position of each shape, in particular the cherries and the leaves on the tree. Because the positions of the frame capture cameras may be well-calibrated with respect to an event capture camera frame of reference, the possible positions of each object to be mapped and matched from frame capture cameras may be reduced to a small grouping of pixels in each camera. Also, in some embodiments, missing information associated with one or more obscured objects may be mitigated, as some objects obscured in one camera view may be found in data associated with a different camera, and precisely mapped to the object. Thus, in some embodiments, objects that may be denoted as blocked or otherwise missing from one frame capture's field of view in a particular frame need not be used for frame registration and stitching of data.

In one or more of the various embodiments, in some cases, a coarse 3-D surface measurement of the shapes may reduce the overall ambiguity and may be orders of magnitude lower in computational complexity. Further, in some embodiments, this may reduce latency in the system. For example, consider the views from frame capture cameras 811 and 813 if the 3-D surface data was not available. In commonly used stereo cameras, stereometric matching for 3-D measurements may be carefully aligned with matching axes so that epipolar matches from one camera may be mapped to a pixel row in another camera; this may simplify the searching for finding an object in another camera. Taking for example, the cluster of cherries including cherry 841. If this cluster may be captured on camera 811, it may be captured as a flat image. Because the position of the cherries may be not known beforehand, it may not be reasonable to assume from the 2-D image in one camera where the cherries may be located in 3-D space, and so these might appear anywhere in camera 813 along the rows with epipolar matches, e.g., all pixels along the entire row may need to be examined and matched with those from the set of pixels of the cherry cluster to find the proper match. Further, in this example, this problem may be magnified in a system where the positions of the frame captures may be arbitrary with respect to one another, and no attempt may be made to align axes between them. Thus, in some cases, absent information about 3-D surfaces, potentially a search may have to performed over the entire image capture space of camera 813 to determine the proper match of the pixels imaging the cherry cluster from camera 811. For example, if both cameras may be 8K cameras, each camera has a 7680×4320 pixel resolution; to match the entire scene, there over a hundred million positions of potentially matching configurations to evaluate; further, since the cameras may be rotated with respect to each other, the number of combinations that require evaluation may be disadvantageously large. While this disadvantage may be mitigated by careful calibration of the system, in some cases, the search space for any particular set of images may be large and may still include tens of millions of possibilities to evaluate. Accordingly, in some cases, this may be impractical if addition or removal of cameras to the system may be anticipated. In contrast, for some embodiments, employing event cameras to generate scanned trajectories may enable faster calibration of the frame capture cameras or faster calibration of the event cameras. Further, in some embodiments, employing event cameras may provide detailed information of the 3-D shapes of the objects that may be also captured on the frame capture cameras. In an example, inset 851 shows a small portion of the image sensor array of camera 811, and inset 853 shows a small portion of the image sensor array of camera 813. Accordingly, in this example, the cherry cluster captured in each inset may be considered to be determined to be the same set of cherries through 3-D scanning by the event camera subsystem. In this example, which may be not depicted to scale, the positions of the cherry cluster in the image sensor may be located with improved precision; here, a few hundreds or thousands of positions may need to be searched to find the best matching between the portions of the frame. Accordingly, in some embodiments, this process may be repeated for each subsection over the entire image or might be accomplished all at once over the image.

In some embodiments, the portion of the scene that may be captured may be limited to the collective field of views of the cameras. Here, for example, system 800 depicts various cameras all generally pointed together in overlapping cones but may only capture a relatively small portion of the entire scene from one side. In particular, the backs and sides of objects in the scene cannot reasonably be captured in this configuration.

Figure 9A:
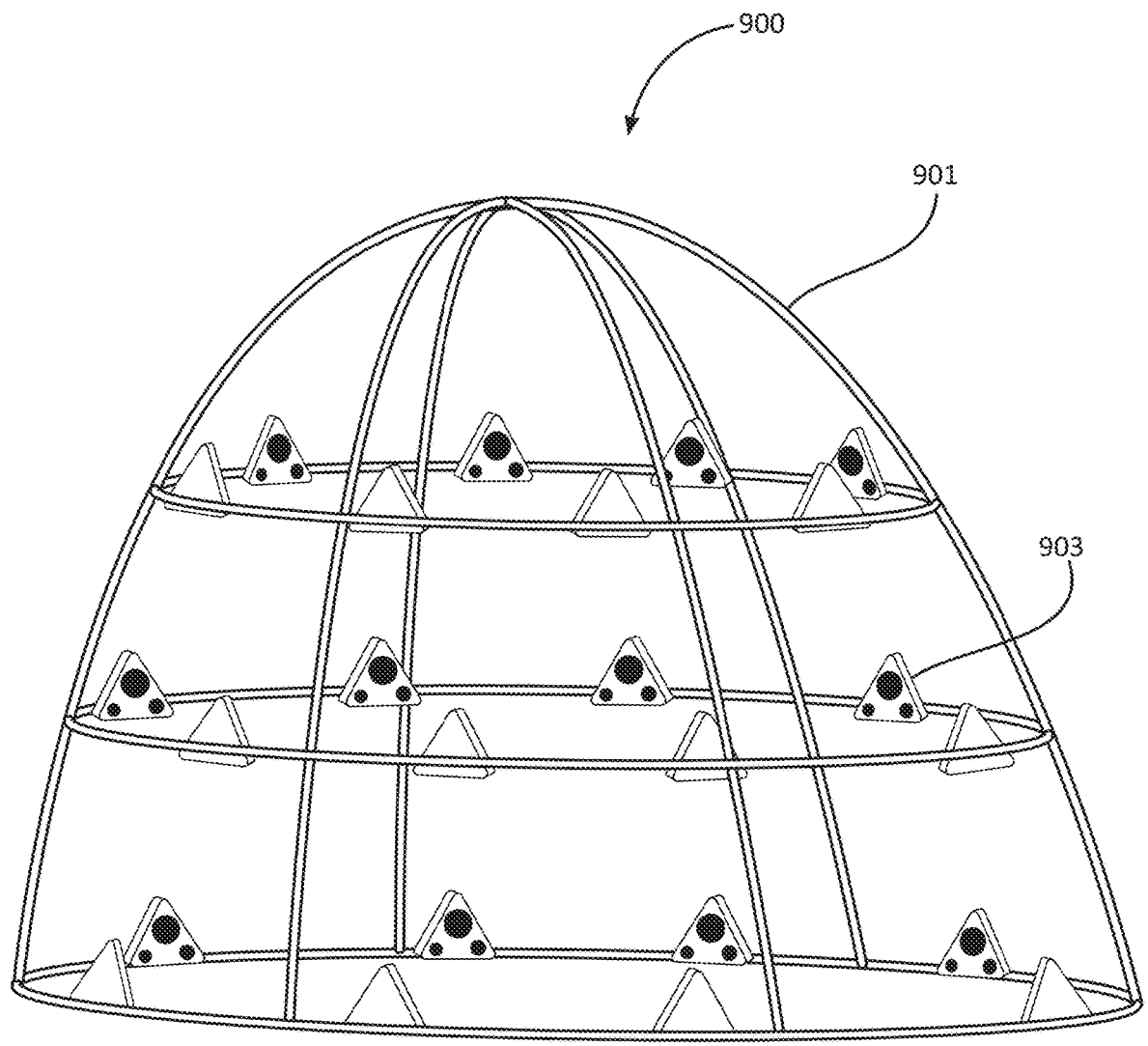
FIG. 9A shows an example of a stage for a stage studio for immersive 3-D video capture in accordance with one or more of the various embodiments.

However, in one or more of the various embodiments, a scene may be captured from more than one direction. FIG. 9A shows an example of stage 900 for a stage studio for immersive 3-D video capture in accordance with one or more of the various embodiments. In this example, stage 900 includes scaffolding 901 which may be depicted as thin poles surrounding a central portion of a scene. Also, in this example, for some embodiments, mounted upon the scaffolding may be a plurality of camera pods, such as, camera pod 903, which may be connected by wires through the scaffolding rods or connected wirelessly to a centralized computer or device. In some embodiments, camera pods may have separate elements mounted together, in this example, comprising a frame capture camera, an event camera, and a beam scanner. As shown, in this example, pods may be pointing inwards towards the center of the stage. In some embodiments, the stage may be portable and may be set up indoors or outdoors. Also, in some embodiments, stages may be constructed or configured to be non-portable or otherwise intended to be fixed to particular locations.

Figure 9B:
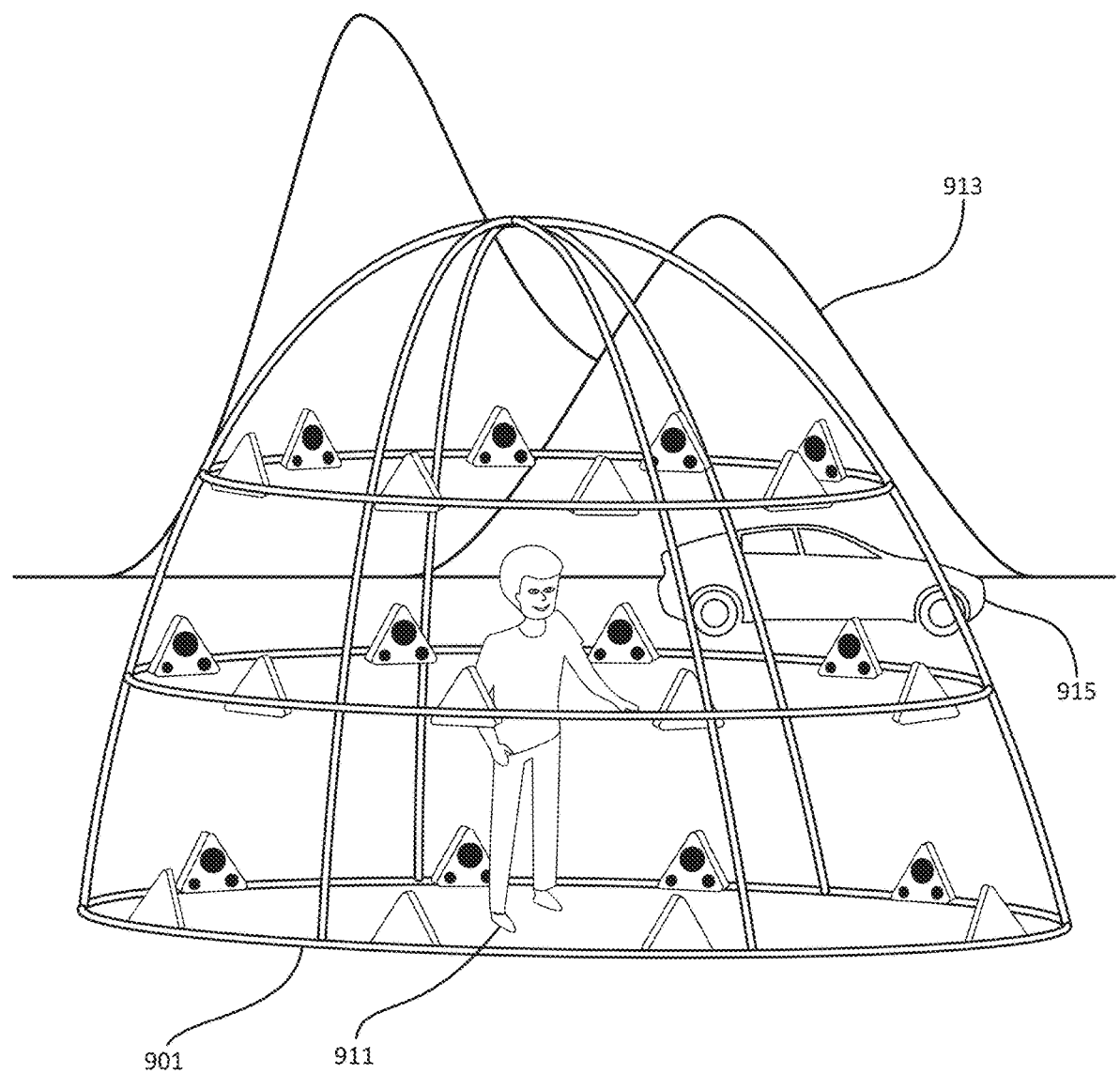
FIG. 9B shows the stage in an outdoor setting for a stage studio for immersive 3-D video capture in accordance with one or more of the various embodiments.

FIG. 9B shows the stage in an outdoor setting for a stage studio for immersive 3-D video capture in accordance with one or more of the various embodiments. Accordingly, in this example, for some embodiments one or more persons, such as, person 911, may be inside stage 900, and other scenery, such as, scenery 913 in the distance may also be visible through the support structure of stage 901. Accordingly, in this example, for some embodiments a scene may include other objects such as automobiles, such as, automobile 915 at an intermediate distance. The scale as shown may be arbitrary; the stage may be constructed as small or large as may be practical depending on local requirements or local circumstances. Accordingly, in some embodiments, objects or persons may be captured inside the stage with high fidelity. Also, in some embodiments, other objects that may be external to the stage may be captured since both event cameras or frame cameras in camera pods mounted on one side of scaffolding 901 may see through holes on the opposite side of scaffolding 901. Note, in some embodiments, although some details of the scene outside the scaffolding of the stage may be obscured by intervening portions of scaffolding, the cameras may be arranged such that at least one or more cameras may see details that may be hidden from one or more other cameras.

Figure 9C:
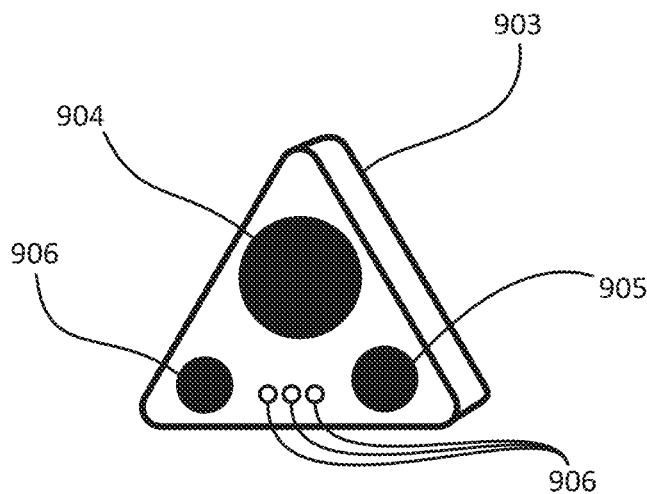
FIG. 9C shows a close-up view of a camera pod for a stage studio for immersive 3-D video capture in accordance with one or more of the various embodiments.

A close-up view of camera pod 903 may be shown in FIG. 9C. In some embodiments, camera pods may be arranged to include: one or more frame capture cameras, such as, frame capture camera 904; one or more event cameras, such as, event camera sensor 905; one or more laser beam scanners, such as, laser beam scanner 906; or the like. In some embodiments, cameras or scanner elements may be mounted close to each other such that they may be considered co-located, but in other one or more embodiments, the distance between the components of a camera pod may be large enough that it may be measured and calibrated to determine precise position information of the components in camera pods. Also, in some embodiments, camera pods may include one or more lighting elements, such as, lighting element 906, which may be LEDs or other similar illumination devices. In some embodiments, lighting elements may be arranged or configured to emit one or more particular colors for illumination or may be tunable to emit different wavelengths of light. Note, one of ordinary skill in the art will appreciate that the shape and size of camera pod 903 as mounted on a stage scaffold may vary depending on one or more design considerations (including aesthetics). In some cases, for some embodiments, it may be a consideration that camera pods include multiple elements that may be mounted in a housing in a predictable fashion. In addition, for some embodiments, the positioning of the elements within the pod may not be a crucial design consideration because event camera subsystems may be used to calibrate the positioning of the entire system. Although, in some cases, for some embodiments, calibration of stages may be simplified if camera pods may be substantially identical. However, in some embodiments, camera pods of different designs or configurations may be used together in the same system.

Figure 9D:
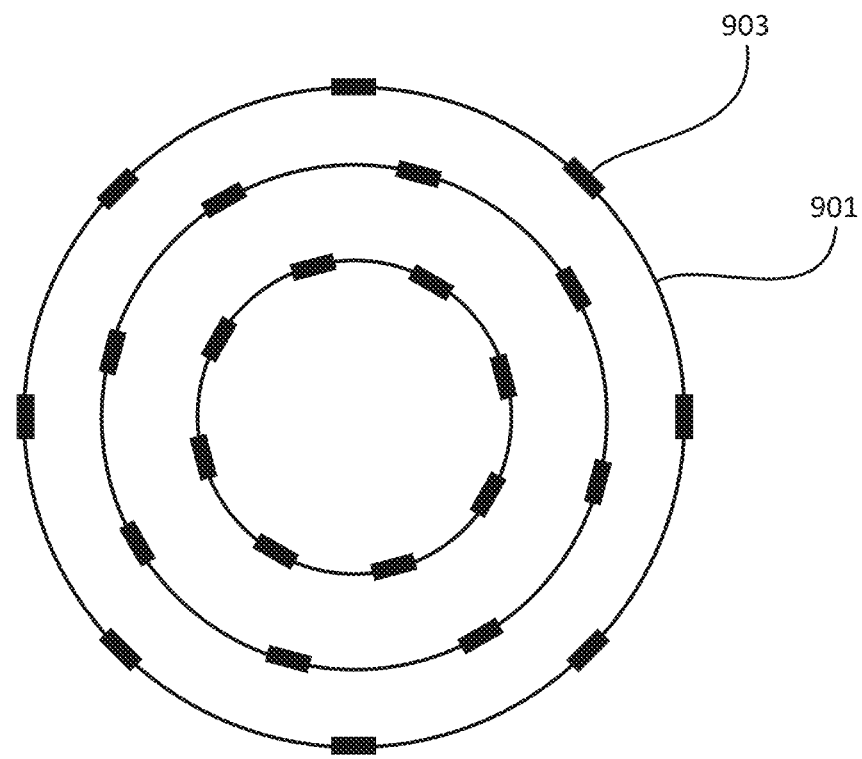
FIG. 9D shows a stage with increased diversity of viewpoints for a stage studio for immersive 3-D video capture in accordance with one or more of the various embodiments.

In one or more of the various embodiments, improved coverage of the scene, particularly within the inner stage area inside the scaffolding, may be achieved by increasing the diversity of viewpoints of the various cameras. Accordingly, FIG. 9D shows one possible layout in accordance with one or more of the various embodiments, which may be considered to be an overhead view of the scaffolding of FIG. 9A. For clarity or brevity, only the circular rings of scaffolding 901 may be shown. Accordingly, in some embodiments, camera pods may be mounted on each ring pointing inwards with an offset in angle around the ring. In this example, for some embodiments, where eight camera pods may be mounted on each ring, each next highest ring may be turned 15 degrees from the lower one. In some embodiments, the vertical spacing may be arbitrary including vertically lined up camera pods. In some embodiments, camera pod positioning may be arranged to be arbitrary within the scaffolding. Also, in some embodiments, camera pods may be positioned asymmetrically if local circumstances indicate that it may be useful to have a greater density of cameras on one side of the stage if more activity to be captured may be concentrated in one direction.

Also, one of ordinary skill in the art will appreciate that other arrangements may be possible, as the layout of the scaffolding of stages may be any shape that does not unreasonably obscure the view of cameras through the gaps in the scaffold portions. In some embodiments, fewer structural rods (scaffold portions) may be used in the scaffolding where the camera pods may be mounted on other rods that attach to the scaffolding. Also, in some embodiments, camera pods may be placed in arbitrary locations around the stage because positioning of the pods may be calibrated before capturing data as necessary. In some embodiments, stages may be arranged such that components such as frame capture cameras, scanning beams, or event cameras may be mounted separately to the scaffolding.

Further, in some embodiments, scaffolding portions of stages may be selected to be sufficiently mechanically stiff to prevent excess much moving of the cameras with respect to one another if the structure of the stage shifts. Also, in some embodiments, the scanning system may be arranged to enable rapid dynamic recalibration. For example, in some cases, scanning systems included in stages may be arranged to self-calibrate tens or hundreds of times a second.

Also, in some embodiments, the scaffolding comprising a stage may be relatively flexible. Also, in some embodiments, the stage scaffolding with camera pods may be mounted on wheels, rails, booms, dollys, cranes, jib arms, or may be otherwise movable. Accordingly, in some embodiments, stages may be employed to capture data while in moving or otherwise in motion. Also, in some embodiments, other ways of mounting cameras for providing a stage may include mounting cameras or scanners permanently within indoor stages or sound stages to provide multi-directional scanning or data capture.

Figure 9E:
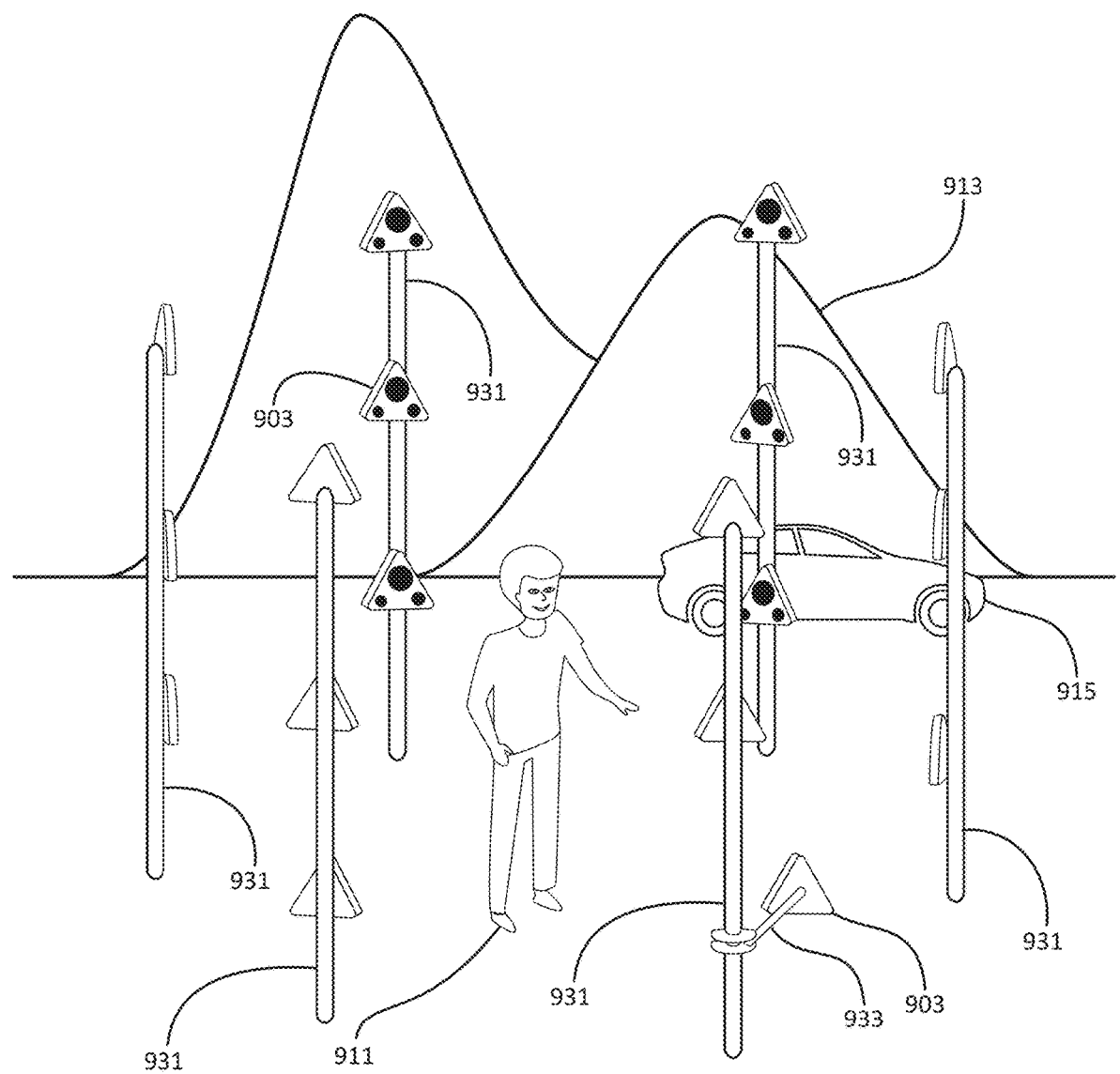
FIG. 9E shows a stage that includes series of poles arranged to mount camera pods for a stage studio for immersive 3-D video capture in accordance with one or more of the various embodiments.

Also, in some embodiments, a full enclosing scaffold system may be not necessary. Accordingly, FIG. 9E shows a similar scene as that of FIG. 9B, but instead of frame scaffolding 901, series of poles, such as, poles 931 may be arranged to mount camera pods 903. In some embodiments, the poles may be driven into the ground outdoors or may otherwise have supports that enable the poles to be self-standing for use indoors or outdoors. Also, in some embodiments, camera pods such as camera pods 903 may be mounted directly to the poles or might otherwise be attached with cross bars such as bars 933 or other mounting hardware offset from the poles. In some embodiments, similar to varied arrangement for stages described above, the positioning of the poles may be regular or may be placed arbitrarily; also, the positions of the camera pods may be regular or irregular, as their positions may be determined later by manual or automatic calibration. Also, in some embodiments, similar to scaffolding 901, the poles arranged to be highly reflective or retroreflective, to improve detecting by both event and frame capture cameras. Also, in some embodiments, event cameras on one or more poles may be configured to determine the position of other poles during the scanning process. In one embodiment, an additional scanner (not pictured) may be mounted on a pole and scanned around the extent of the poles. Accordingly, capture of the timing of the reflected beams may provide another source of position information associated with the pole that the scanner may be mounted using Snellius-Pothinot solutions or other methods. Accordingly, in some embodiments, the scanning time and angles may be obtained from event camera data. Also, in some embodiments, one or more scanners may be arranged to employ the same or separate wavelengths to enable to determine the reflection time.

As mentioned above, in some embodiments, the density of video and 3-D data capture may be greater inside the stage scaffolding and compared to data collected from subject/scenes external to the stage. In a conventional 360° camera system, multiple cameras may be mounted around a central point aiming all around the camera. Accordingly, conventionally, the separate video streams may be merged algorithmically to create a seamless video stream. In some embodiments, In the stage shown in FIG. 9B, the interior of the stage may be captured in high detail while also capturing and stitching together 360° video from outside the stage. Because the frame capture cameras in the various camera pods that comprise a stage may be positioned with a diversity of viewpoints such that in combination the one or more cameras may provide complete or nearly coverage of the area/scenes external to the scaffolding of the stage by capture information by "viewing" through the scaffolding.

In some embodiments, the stage itself may be the focus of an immersive experience that may be transmitted to a user in a number of ways, including through a standard television screen or through a 3-D television where the user may adjust their position. In an embodiment, the user may be included into a virtual environment using virtual reality goggles or similar equipment; in this case, the user may experience a point-of-view of being within the stage area with full view of the entire area from any direction.

In some embodiments, the user may be provided a near seamless view of the scene environment based on blending the viewpoint from each frame capture camera matched to 3-D surface data provided by the event camera data stream; textures from the video stream may be mapped to the surface data if viewing objects inside the stage. In addition, in some embodiments, the user may be enabled to be immersed in one or more portions of the area outside the stage, though in some cases less information may be available about objects outside the stage. For example, for some embodiments, depending on the distance or camera density, intermediate objects such as automobile 915 may only be visible from one side, but this side may be captured by several cameras that may be positioned to capture imagery or events by looking across the stage and through the scaffolding of the stage on the opposing side. Accordingly, in some embodiments, there may be sufficient data to virtually position the viewer at an arbitrary distance outside the stage and render the view of the subjects, such as automobile 915 from the user's point-of-view, with the correct 3D perspective, using traditional stereometric or multi-view photogrammetry methods.

Additionally, in some embodiments, if objects (e.g., background objects), such as, automobile 915, live local audiences, band members, or the like, may be near enough to the stage to be within the event camera scanning range. Accordingly, in some embodiments, as described earlier, active scanning methods may enable the same low-computational, low-latency 3D motion capture and rendering particularly advantageous to realistic (faithful, artifact-free) representation of objects and shapes in motion. Thus, in some embodiments, a live concert (or sports event) may be realized where the band, or other background subjects, may be viewable from one or more perspectives or directions by both local live audiences as well as the remote viewing audiences, and at the same time the remote viewing audience may be provided a 3D view of the live audience interacting to the performance.

In some embodiments, if the video streams may be processed and merged, the scaffolding of the stage may become invisible in the output video stream. In some embodiments, this may be accomplished in several ways described below. In one embodiment, from the frame capture cameras alone, the stage scaffolding may be used to provide reference fiducials for the scene beyond them. Because the cameras may be all calibrated with respect to one another, the field of views may be also known for each camera. In some embodiments, if the scaffolding rods may be used as fiducials, the background scenes may be depicted based on their relationship to the fixed position (at each time snapshot) of the background with respect to each camera. In some embodiments, scaffolding rods may be separated from the background of the scene using the video streams from the separate frame capture cameras, but in some embodiments, they may be coated with particular surface coatings to improve the ability to differentiate them from the rest of the scene. For instance, in some embodiments, the scaffolding rods may be coated with a highly reflective or retroreflective coating that enables them to appear brighter to the cameras than the rest of the scene. In some embodiments, lighting of the scene or the stage may be periodically modified to accentuate the appearance of the rods. For example, in some embodiments, if the rods comprising a stage scaffold may be coated to have increased reflectivity at a given wavelength such as 405 nm (which may be nearly invisible to the human eye or many cameras with selected filters, and typically not represented in rendered video images) or 450 nm (deep Blue) for example, then every few frames a flash of light from internal illuminating LEDs or other light sources may be incorporated in the video stream where the scaffold rods may be especially visible to the cameras and their positions could be ascertained. In one embodiment, each event camera may also report out the continuous 3-D position of not only objects within the stage but also the scaffolding rods. Accordingly, in some embodiments, this position information may also be merged with video data of camera position and rod position from the frame capture cameras to improve video stitching that may be employed to merge the video streams. In some embodiments, additional cameras pods may be added to the outside of the scaffolding facing outwards to supplement the view outside the scaffolding. In some embodiments, the ground or stage surface may be used as an additional fiducial reference, as multiple points may be imaged by both frame capture and event cameras.

In some embodiments, one or more objects outside the stage may be treated successively differently depending on their distance from the stage. For example, those objects further away such as background scenery 913 may show little to no parallax difference between different frame capture cameras while objects somewhat closer may display some parallax shift, but the shift may be small enough to treat the objects as being in the far field. Accordingly, in some embodiments, as intermediate objects get closer, they may ordinarily become more difficult to place within a 3-D scene, but within a certain range they will be visible not just by the frame capture cameras but also by the event cameras and scanners. In this case, 3-D information of their position with respect to the stage and the cameras may be available, so that stitching or merging between the cameras may be improved in quality or performance. As mentioned previously, objects closer to the cameras or objects that may be moving, may become more difficult to merge together into a scene using only frame capture cameras; this may be mitigated if the 3-D surface information may be added from the event camera data stream.

In some embodiments, the combination of data from multiple frame capture and event cameras may provide other improvements as well. For example, in some embodiments, the event camera/scanner subsystem captures the surface shape of objects but may track the movement of the objects very quickly. In particular, for some embodiments, edges of objects may be also tracked faster than the frame rate of frame capture cameras. For instance, because a frame capture camera may integrate the light it receives over a certain time, a fast-moving human hand may appear to be a blur within one frame of the camera. Although some frame capture cameras may be configured to only measure light during a small percentage of its frame time to reduce motion blur, this has the unwanted side effect of drastically reducing the amount of light that forms the image in that frame. In some embodiments, data determined from event cameras of surface or edge movements may be used to improve the quality of each image in the frame capture camera video by using the position of moving objects as measured over time in the event camera to pinpoint their positions during each frame captured. For example, if one may be running a frame capture camera at 100 Hz, each frame may be captured every 10 ms. If the system may be capturing the movements of a dancer's hand moving at 1 m/s, the hand may move 1 cm during the frame capture. At a pixel level, a pixel may be within that frame may capture both a finger as well as the space between the fingers of a hand with a blurry transition effect. However, this camera as well as other frame capture cameras may be also capturing the scene over time, so other objects behind the hand as well as the background may be continuously captured as well.

Accordingly, in some embodiments, a scanning system may be configured to remove motion blur from the frames enabling the positions of each finger of the hand determined from the event camera data stream to map out the positions precisely to at least partially correct the scene. Also, in some embodiments, because the background and objects may be captured from two or more directions, the background of the scene between the figures may be registered or otherwise aligned up to match with a viewer at different locations within the capture area.

In some embodiments, using the event camera movement to synchronize frame capture cameras with the movement may enable variability between cameras. Accordingly, in some embodiments, synchronizing the time base of each frame capture camera with each other camera in the stage may not be required. Also, in some embodiments, frame capture cameras in various camera pods may be configured to operate using different frame rates. In this case, in some embodiments, the final composite 3-D video streams may be joined together using the faster time base of the event camera data. In an embodiment, frame rates of the frame capture cameras may be upscaled directly using the 3-D surface data rather than by using complicated AI image processing, since the event camera scans may capture surface descriptors at higher density and faster than frame capture cameras could. In some case, for some embodiments, other types of cameras may be used with this system as well; many frame capture cameras have a global shutter where the frame may be taken simultaneously across the image sensor of the camera, but cameras with other mechanisms such as a rolling shutter may be accommodated by synchronization with the event camera data as well.

In one embodiment, the exact positions of objects and people may be used to improve sound capture in the scene as well as visual data. For example, the camera pods may also have microphone inputs for audio capture, but other microphones separate from the camera pods may be used. Accordingly, In some embodiments, the system may pinpoint where a sound source may be in space by measuring it's 3-D position and surface shape (e.g., a person's mouth for speech), arrays of microphones may be more easily tuned to separate audio from multiple sources including interference, environmental noise, and others. Although microphone arrays may be currently processed to record and localize audio from a particular direction, if the actual position of subjects in the scene may be known, the search space of the audio signal may be reduced. In one embodiment, a separate microphone may be automatically turned toward the known position of the sound found by visual means to improve capture of just the desired audio with less audio interference.

Figure 10:
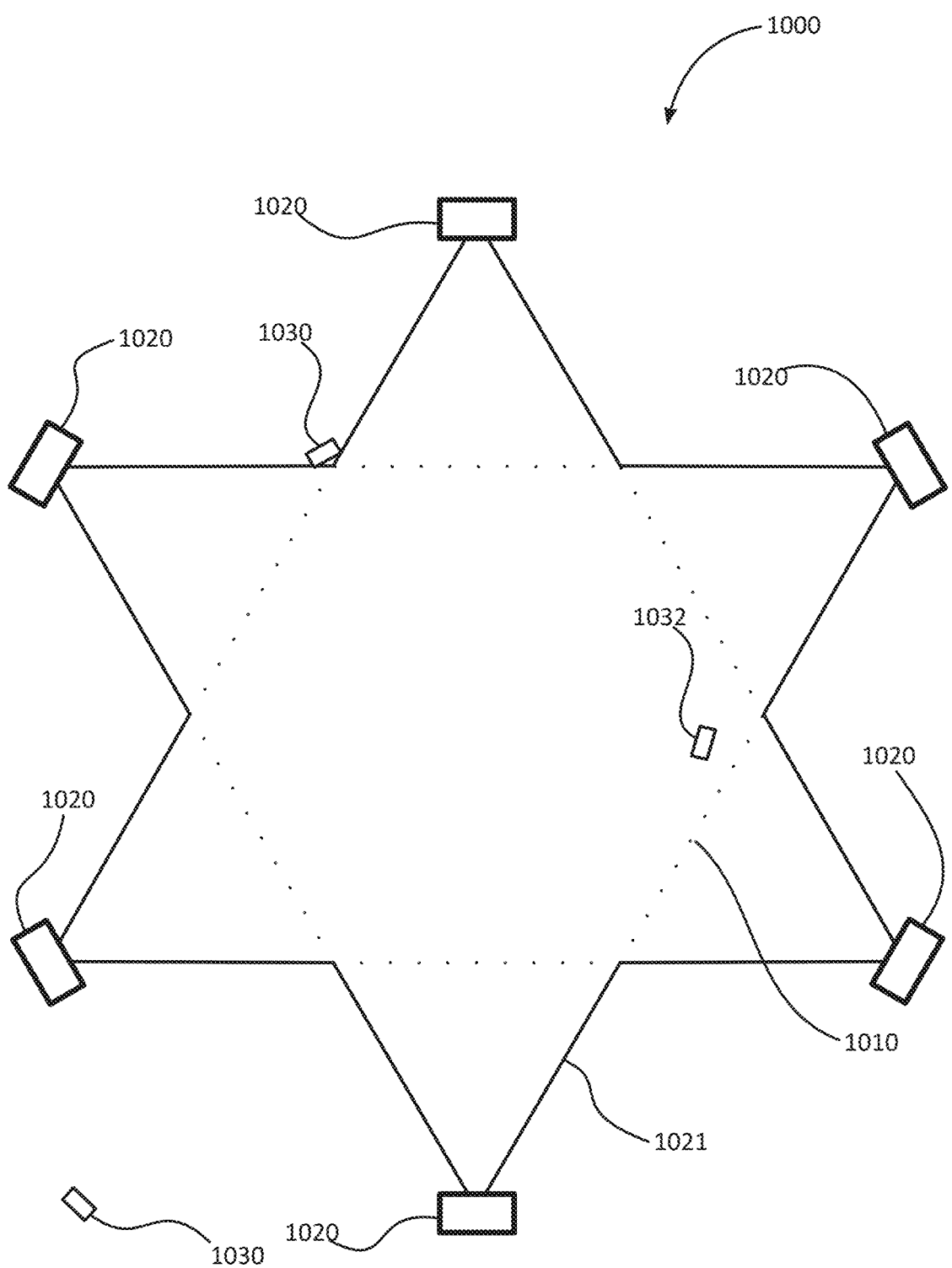
FIG. 10 shows a top view of one example of a stage for a stage studio for immersive 3-D video capture in accordance with one or more of the various embodiments.

In some embodiments, a stage may be arranged to employ various arrangements of cameras. In one embodiment, a fixed installation may be done on an indoor stage with multiple cameras surrounding a central stage. FIG. 10 shows a top view of one example of stage 1000 for a stage studio for immersive 3-D video capture in accordance with one or more of the various embodiments. In this example, for some embodiments, camera pods 1020 may be placed around a central stage area. In this example, star-shaped area 1021 denotes the fields of view of the various cameras, which here may be considered to around 60°. Note, in some embodiments, other arrangements of cameras may be employed depending on local requirements or local circumstances.

In this example, central stage 1010 may be the portion where the fields of views of the various cameras overlap. In some embodiments, camera pods need not be in the configuration of FIG. 9C but may be significantly larger. Also, the shape of the stage may be completely arbitrary; accordingly, in some embodiments, the stage may be octagonal, or have any even or odd number of camera pods 1020. Though there may not be a scaffolding here as depicted in FIG. 9A, other stage structures may provide similar functionality to the system. Also, stages, such as, stage 1000 may be not limited to camera pods 1020. In some embodiments, additional camera pods, such as, camera pods 1030 may be placed in arbitrary locations, possibly closer or further from the stage than camera pods 1020. Also, in some embodiments, camera pods outside stage area 1010 may be mounted at various heights without interfering with the fields of view of the main area. Some, such as camera pod 1032, may be mounted above the stage, in or on the floor of the stage, or the like. In some embodiments, other camera elements may be mounted within the field of view of one or more of camera pods 1020 and be removed from the video output stream if compositing the data streams. Also, in some embodiments, one or more additional camera pods may be positioned or oriented to provide a less-obstructed view of an audience sitting on the outside of the stage, though some views may be already available from camera pods 1020.

In some embodiments, both stage 900 and stage 1000 may have diverse elements or configurations. For example, although the camera pods may be selected to be substantially identical, various camera pods that comprise stages may also be different from one another. Also, in some embodiments, one or more frame capture or event cameras in a stage may have fields of view that may be different from one other, while other cameras in the stage may have different focal lengths. Also, in some embodiments, one or more scanners may scan the scene with tightly focused beams for close-range detail, while other scanners may be focused at longer distances to cover a longer range. Also, in some embodiments, a given stage may include various numbers of cameras or scanner elements that may be added to the system in various configurations.

In some embodiments, captures elements, such as, scanning beams, frame capture cameras, or event cameras included in stages may be calibrated to an arbitrary level of precision whether the scanning beams, frame capture cameras, or event cameras may be combined together in pods or mounted separately. In some embodiments, calibration may be done in detail at the beginning of the capture session. Also, in some embodiments, calibration may be performed dynamically as the scene shifts, or the various elements move.

Figure 11A:
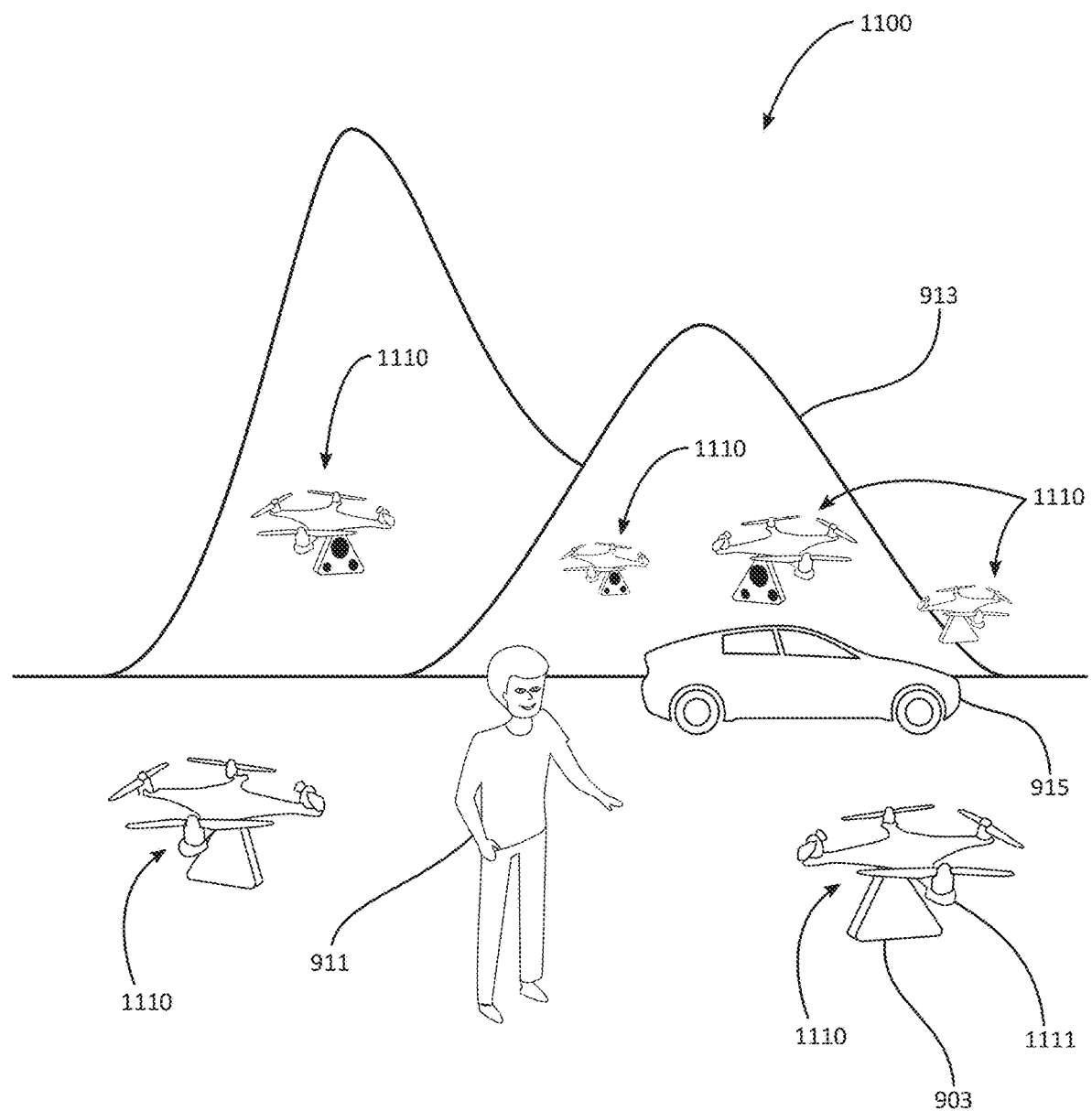
FIG. 11A shows a scene where drones may be used as part of the capture system in accordance with one or more of the various embodiments.

In one embodiment, the various capture elements may move dynamically and independently during capture. FIG. 11A shows scene 1100 where flying drones may be used as part of the capture system in accordance with one or more of the various embodiments. In some embodiments, capture drones, such as, capture drones 1110 may comprise a flying drone 1111 (e.g., a quad-copter, or the like) with at least one attached camera pod, such as, camera pod 903. Accordingly, in some embodiments, multiple capture drones, such as, capture drones 1110 may be deployed around the scene focusing on points of interest. In some embodiments, each drone may have at least one camera pod such as camera pod 903 attached to it. Also, in some embodiments, one or more drones may have more than one camera pod.

In some embodiments, camera pods may be attached to drones in a variety of ways, whether they may be perpendicular to the drone housing, mounted facing directly down from underneath the drone, or the like. Accordingly, in some embodiments, sufficient numbers of drones may be deployed to cover the scene from various angles similarly to that as shown in FIG. 9B. However, in this embodiment, the stage created by the aggregate of all the camera pods may be inherently moveable, and the areas of focus may be moved as needed to capture a particular scene or event.

In some embodiments, a scene may similarly include people 911, background scenery 913, or other objects 915. In this case, a stage may be considered to be more fluid, as the active capture area may change based on the current positions of the drones. Further, in some embodiments, capture drones may be directed to follow individual people or groups around the scene or may follow moving vehicles. Thus, in some embodiments, a remotely dispersed audience may experience an immersive 3d "bird's eye view", and experience panoramic live action events such following a peleton in the "Tour de France" from any position within the capture space of the capture drones.

In some embodiments, the scene may be captured entirely by capture drones 1110, but in one embodiment, capture drones may be a portion of a hybrid capture system such that one or more larger capture emplacements may be incorporated in the overall system. Accordingly, in some embodiments, capture emplacements may be fixed camera systems (with functionality similar to a camera pods), other fixed camera pods, or other larger systems mounted on ground vehicles.

Figure 11B:
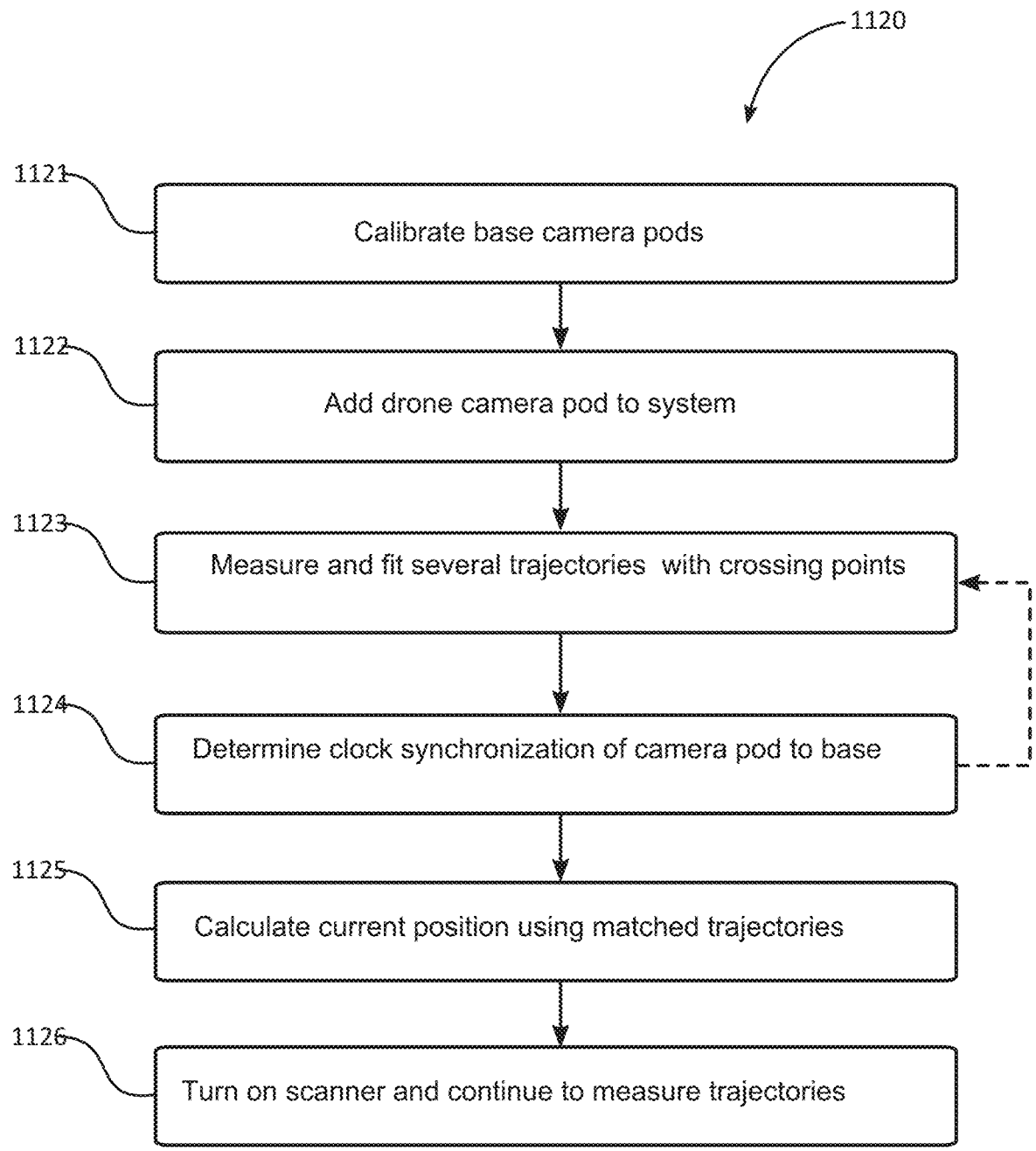
FIG. 11B illustrates a flowchart for a process for calibrating drone camera pods as part of an overall capture system in accordance with one or more of the various embodiments.

In some embodiments, calibration of the capture drones may have similar aspects to calibration of the stage 900 but may be initially configured then continuously recalibrated on the fly. FIG. 11B shows process 1120 for calibrating drone camera pods as part of an overall capture system.

Also, in some embodiments, a hybrid capture system may be used. In this case, in step 1121, the base camera emplacements may be first calibrated for position and orientation. This may be accomplished as before, where a number of trajectories may be traced over objects in the scene; techniques such as bundle adjustment may be used with sufficient number of trajectories in the scene to determine positions to a scale. In some embodiments, distances between any two cameras may be directly measured, or else objects with a known size may be used to determine relative scale value. Alternatively, in some embodiments, crossing points of various trajectories may be used to pinpoint locations of the event and frame capture cameras. In step 1122, a new drone camera pod may be added to the capture system. Which drone added may be arbitrary, but it may be the first drone that has event cameras that sense scanning beams that show several crossing points.

Figure 11C:
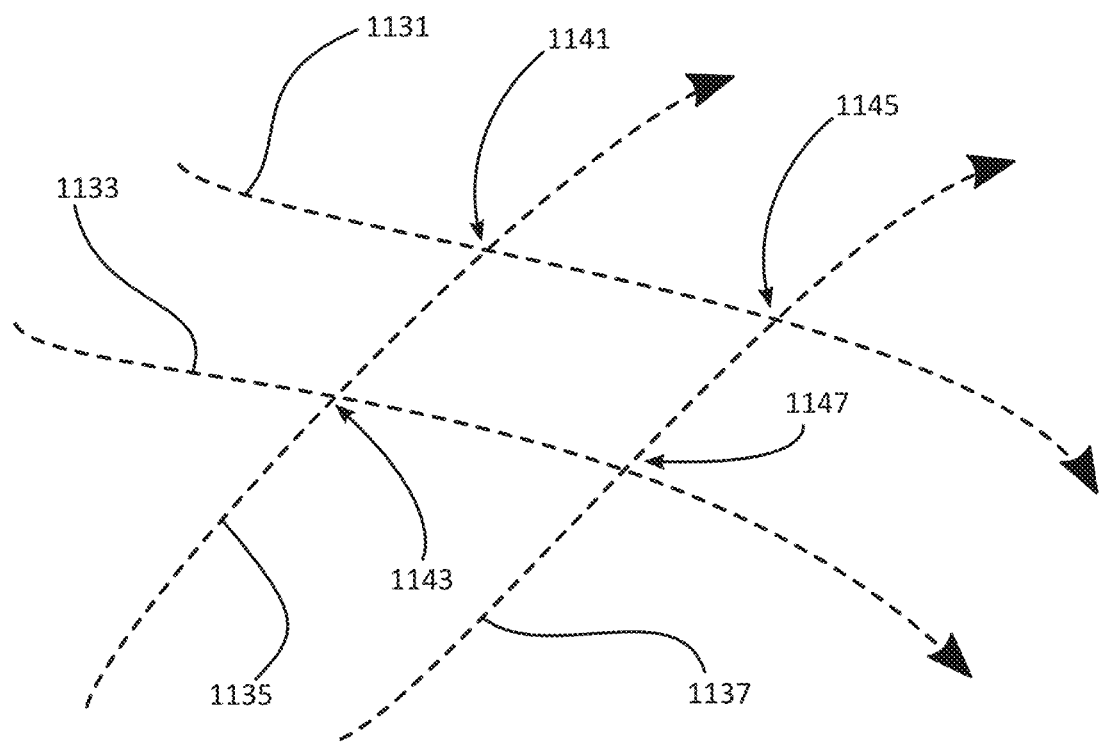
FIG. 11C shows several trajectories that have been traced across an object in the scene in accordance with one or more of the various embodiments.

FIG. 11C shows several trajectories that have been traced across an object in the scene. Note, this figure shows the reflected trajectories as seen by the event camera. Trajectory 1131, trajectory 1133, trajectory 1135, trajectory 1137 may be illustrated here with a terminating arrow to indicate that the beam was scanned in a particular direction that may be detected by examination of the increasing event times that of the events that may be part of the trajectory. In some embodiments, one or more trajectories may cross at certain places on the event camera image sensor. In this example, for some embodiments, trajectory 1131 and trajectory 1135 cross at point 1141, trajectory 1131 and trajectory 1137 cross at point 1145, and so on. In step 1123, in some embodiments, four trajectories may be found that have at least four crossing points in the image sensor. Each trajectory may be fit to a parameterized functional form; thus, the position and timing of each crossing point may be determined to a sub-pixel position, and a time faster than the event camera resolution. in this example, for some embodiments the trajectories may come from four separate scanned beams, though it may be not necessary for them to actually cross at the same time. If the scanning speed of the beams may be high enough compared to the movement speed of the drone, beams that have a measurable crossing point could go over the object after the first beam may be done scanning. In some cases, a beam may cross itself at a later time and be used for this purpose. In some embodiments, each crossing point may have several characteristic parameters in the form of (x, y, t1, t2). For instance, crossing point 1141 may have a measured (x, y) coordinate in the event camera image sensor space, t1 may be the time the first beam crosses that spot, and t2 the time the second beam crosses the same spot.

In some cases the beam that crosses first may be known based on the capture drone's event camera since the events may be reported in the time base of the drone's camera. However, in some embodiments, at this point, it may be not known if the event clock may be synchronized well with the event clock on one of the base camera pods.

Note, though only four crossing points may be shown here, the scene may have a large selection of crossing points to pick from some or all with easily discernable points. One of ordinary skill in the art, that many variations may be possible, but in general each laser scanner (whether fixed or mounted on a drone) may scan a set of beams simultaneously in a variety of scanning directions. In some embodiments, the set of beams may comprise only one beam or may have two or more beams scanning from it. In some embodiments, the scene may also be scanned by additional sets of beams where the sets of beams may be scanning in the same direction or in broadly different directions at the same time.

Accordingly, if S sets of beams scan a scene and there may be N beams in each set of beams that do not cross each other in a single scan, the total number of possible crossing points from a single set of scans has a maximum of $\frac{1}{2} S(S-1)N^2$. In some cases, some of these crossing points may not be visible from each camera, but for position matching, it may be sufficient to select crossing points that may be visible by two or more cameras. The selection of crossing points for other cameras in the system may be chosen differently, if there may be continuous overlap of fields of view of various cameras around the scene. For example, if the position of three cameras, A, B, and C may be ascertained from a particular set of crossing points, a fourth camera D may be localized even if D cannot see the same set of crossing points used to localize A, B, and C, so long as one or two of A, B, or C may see other crossing points visible to D. In some embodiments, the number of simultaneous beams that may be measured may be ultimately limited by the discerning power of the individual event cameras, as there may be limitations on how many events each one may process, but if possible more complete coverage and measurement of each 3-D surface of the scanned objects will result from including as many scanning beams as possible. In some embodiments, additional beams may not interfere with each other as long as individual events that comprise the scanned trajectories may be still able to be calculated and fit to trajectories from the event data. Also, in some embodiments, a denser sweep of beams over the scene may also allow faster refresh time on movements of the objects in time as well, thus allowing tracking of objects rapidly moving through the scene.

In step 1124, in some embodiments, the event clock of the drone camera pod may be synchronized to the base camera pods. In one or more embodiments, the base camera pods may send a wireless clock signal for synchronization, in some cases this may be susceptible to interference or a large amount of jitter. Accordingly, in some embodiments, the time correction between the clock may be calculated from crossing time differences. In the crossings shown in FIG. 11C, the four crossing points, crossing point 1141, crossing point 1143, crossing point 1145, crossing point 1147 have eight distinct crossing point times. Though the absolute times may not be known at another event camera on a different camera pod, the time spacings relative between all of these crossing points may be distinct. Accordingly, in some embodiments, by communicating with other camera pods either in the base pods or with other drones that have been calibrated previously, a match with these crossing point times may be found. If this may be the case, the time base of the drone event camera clock may be set to the time base of other cameras, after which events and trajectories may be set relative to the new time base. On some occasions, no match of event times may be found with other cameras, so step 1123 may be repeated to find a new set of crossing points. In one embodiment, step 1123 may be repeated several times even after matching crossing points were found to determine additional other crossing point sets that may be employed to average the synchronization. In some cases, for some embodiments, if there remains jitter in the events reported at each camera, this may give a better result than only doing a single time measurement. In some cases, it may be discovered that the time offsets between cameras may drift after a certain time window. Accordingly, in some embodiments, step 1123 and Step 1124 may be repeated when necessary to resynchronize the clocks, particularly if a drone has lost connection or otherwise become unavailable.

In step 1125, in some embodiments, the drone camera may be considered as a camera with unknown position but known event times where the position of the drone camera may be calculated. In some cases, event trajectories that were used for time calibration may also be used to calculate the current position. In other cases, new trajectories may be measured from other scanned lasers, or similar methods as before (bundle adjustment, crossing point calibration, or the like) may be used to determine the instantaneous position or orientation of the event camera. Accordingly, in some embodiments, the position of the frame capture camera may also be determined if it may be mounted in a known measured camera pod. Also, in some embodiments, the frame capture camera may also observe portions of scanned trajectories within its frame capture time window, including crossing points, and use those to calculate its position as well. At this point, in step 1126, the scanner of the camera pod may be activated enabling the drone to be included as part of the capture drone system. Also, in some embodiments, trajectories may be continuously measured and compared over time. Measured trajectories over time may be used to calculate dynamic 3-D surface data of objects being measured. Also, the measured trajectories may be used to continuously recalibrate the positions of drone event cameras as they move. Accordingly, in some embodiments, the drone may maintain a map of where it may be located relative to the other drones or base cameras in the system. Also, in some embodiments, a base server may keep track of locations such that it may be arranged to broadcast position information to the drone where it may move. Over time, in some embodiments, the drone may track not only its position but also its velocity with respect to all other objects in the system (both drones as well as objects to be measured).

Note, in some embodiments, new drones may be added to the system at this point starting at step 1122. In some embodiments, multiple camera pods may be added substantially at the same time. Accordingly, the system may be flexible such that it may allow different camera pods to drop in and out of the data stream depending on current needs. In a separate embodiment, a similar process may be used without base camera pods, but instead using drone cameras in ad hoc networks. In this case, in some embodiments, in place of step 1121, two or three drone camera pods may be chosen and roughly aligned toward an object to scan; all camera pods may be set to start scanning and may look for objects and crossing points from other scanners immediately. Although, in some embodiments, this may be done while in motion, it may be advantageous to attempt to keep the initial drones as stationary as possible during the initial calibration step to enable improved (e.g., faster) convergence on a calibration solution as soon as some crossing patterns may be seen from another drone, they may be compared and synchronized. Note, in some embodiments, an event camera may capture the beam from its own camera pod as it scans; though this beam may be not particularly useful for triangulation, it may nevertheless see its own crossing times and use those for comparison with other cameras as well. Accordingly, in some embodiments, if a base set of drone event cameras have been synchronized with respect to each other, they may determine their position, and then other drones may be added to the system as before. In some embodiments, a drone may be chosen as the reference position for the system. In some embodiments, the selected reference drone could change periodically to other drones in the system. Also, in some embodiments, position may also be measured with respect to stationary objects in the scene.

In some embodiments, position and time calibration may be fine-tuned after the initial collection of data. Though the events as captured at each camera may be calculated and reported in real-time, in some cases, there may be some errors in calculation of camera position as well as time base.

Also, in some cases, the data stream may be very rich, such that the data rate may exceed real-time computational capacity of the system. Accordingly, in some embodiments, the collected data may be corrected or otherwise processed later to improve precision or accuracy associated of the system.

The capture drone system has been described as including camera pods which may simultaneously measure event camera data for 3-D surface measurement and frame camera video streams. However, in some embodiments, one or more drones may only be used for 3-D surface measurements alone such that the camera pods on each drone may include one or more event cameras or optionally a laser scanner. Accordingly, in some embodiments, the set of capture drones may then be used for measuring the 3-D surfaces of all objects in the scene, which could be used alone or to supplement video data of the scene taken from other sources.

In some embodiments, frame capture cameras in camera pods may be tuned for fine color discrimination. For example, many standard image sensors for cameras employ patterned color filters to detect color pixels, since the sensor itself, though often having different sensitivities to various frequencies of light, still primarily may be monochrome at the sensor level. For example, a common filter type may be the Bayer color filter which has red, green, and blue filters over various individual pixels. Conventionally, well-known reconstruction algorithms may be used to recover a high-definition signal with full RGB color, but artifacts may still occur.

Figure 12:
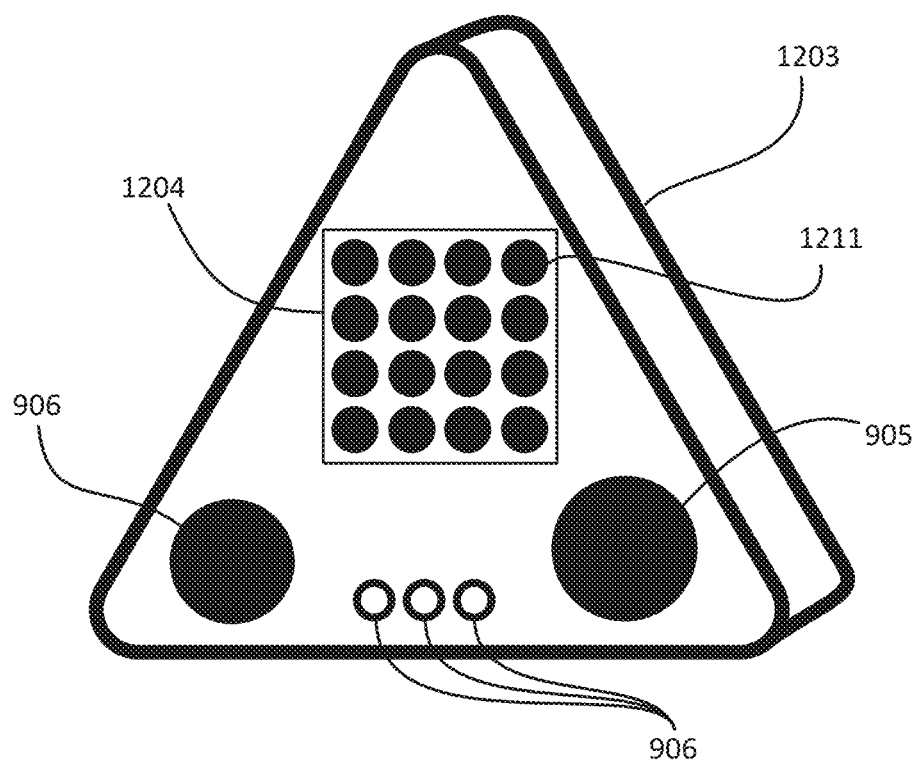
FIG. 12 shows a variant of a camera pod that includes a camera array in accordance with one or more of the various embodiments.

FIG. 12 shows a variant of a camera pod (camera pod 1203) that may be similar to camera pod 903, but the frame capture camera may be replaced by a camera array 1204. In this example, for some embodiments the camera array may have sixteen individual frame capture cameras 1211, each camera with a different single color filter in front of it. Though the cameras 1211 may or may not be smaller than single camera 904, the design may be simpler and more compact as the lens on each camera, such as camera 1211 need account for one narrow-band wavelength of light. Accordingly, in some embodiments, the cameras may be aligned so that their pixels and fields of view substantially overlap. However, in some embodiments, this may be not necessary, since each camera in the array may be individually calibrated using 3-D event camera and scanner data to determine their precise location and orientation. In some embodiments, the camera array may have three, four, eight, or more different cameras and corresponding color filters. In some embodiments, these may be chosen to adequately span the desired color gamut to be measured in the application, including frequencies outside of visible light. In some embodiments, camera pods 1203 may be used in a hybrid system along with camera pods 903.

Also, this will be understood that each block (or step) in each flowchart illustration, and combinations of blocks in each flowchart illustration, may be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as may arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block (or step) in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, may be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Further, in some cases, for brevity or clarity, signal generators may be referred to above as lasers, scanning lasers, or the like. Accordingly, one of ordinary skill in the art will appreciate that such specific references may be considered to be signal generators. Likewise, in some cases, sensors, event sensors, image sensors, or the like, may be referred to as cameras, event cameras, image cameras, frame capture cameras, or the like. Accordingly, one of ordinary skill in the art will appreciate that such specific references may be considered to be sensors, event sensors, image sensors, or the like.

What is claimed as new and desired to be protected by Letters Patent of the United States is:

1. A method for sensing objects using one or more processors to execute instructions that are configured to cause actions, comprising:
    capturing a two-dimensional video of a scene with two or more frame cameras oriented towards a center of the scene;
    scanning a plurality of paths across one or more objects in the scene with one or more signal beams oriented towards the center of the scene;
    generating a plurality of events based on one or more signal beams that are reflected by the one or more objects and detected by one or more event cameras oriented towards the center of the scene;
    generating a plurality of trajectories based on the plurality of paths and the plurality of events, wherein each trajectory is a parametric representation of a one-dimensional curve segment in a three-dimensional space; and
    generating a three-dimensional scene that includes a representation of the one or more objects based on the captured two-dimensional video and the plurality of trajectories, wherein a position and an orientation of the one or more represented objects in the scene are based on the plurality of trajectories.

2. The method of claim 1, wherein generating the scene further comprises:

determining a position of the scene based on one or more other positions of the one or more event cameras, an orientation of the two or more frame cameras, and another orientation of the one or more event cameras, wherein a portion of the scene that is outside the scene is an external scene and another portion of the scene that is inside the scene is an internal scene;

capturing two-dimensional video of the external scene employing the two or more frame cameras;

scanning a plurality of other paths across one or more other objects in the external scene with the one or more signal beams;

generating a plurality of other events based on one or more other signal beams that are reflected by the one or more other objects and detected by the one or more event cameras;

generating a plurality of other trajectories based on the plurality of other paths and the plurality of other events; and modifying the scene based on the two-dimensional video of the external scene and the plurality of other trajectories, wherein the modified scene incorporates a representation of the one or more other objects in the external scene.

3. The method of claim 1, further comprising:

attaching the two or more frame cameras to a framework to fix a position of the two or more frame cameras around the center of the scene, wherein the framework is comprised of rods or bars that encircle the scene to enable one or more frame cameras a view of one or more areas external to the scene;

attaching one or more signal generators for the one or more signal beams to the framework to fix the position of the one or more signal beams around the center of the scene to enable the one or more signal beams to scan a plurality of other paths across one or more other objects in the one or more areas external to the scene; and attaching the one or more event cameras to the framework to fix the position of the one or more event cameras around the center of the scene to generate a plurality of other events based on the signal beams reflected by the one or more other objects in the one or more areas external to the scene.

4. The method of claim 1, further comprising:

attaching the two or more frame cameras to one or more vertically oriented poles to fix a position of the two or more frame cameras around the center of the scene, wherein the one or more poles are positioned around the scene to enable one or more frame cameras to view one or more areas external to the scene;

attaching the one or more signal beam generators to the one or more vertically oriented poles to fix the position of the one or more signal beams around the center of the scene to enable the one or more signal beams to scan a plurality of other paths across one or more other objects in the one or more areas external to the scene, wherein the one or more signal beam generators generate the one or more signal beams; and attaching the one or more event cameras to the one or more vertically oriented poles to fix the position of the one or more event cameras around the center of the scene to enable the generation of a plurality of other events based on the signal beams reflected by the one or more other objects in the one or more areas external to the scene.

5. The method of claim 1, further comprising:

attaching the two or more frame cameras to one or more aerial drones, wherein the one or more flight capable drones are dynamically positioned around the scene;

attaching one or more signal beam generators to the one or more aerial drones, wherein the one or more signal beam generators generate the one or more signal beams;

attaching the one or more event cameras to the one or more aerial drones; and updating the scene based on a current position of the one or more aerial drones.

6. The method of claim 1, further comprising:

positioning one or more of the two or more frame cameras, the one or more event cameras, or one or more signal beam generators to provide one or more overlapped fields of view of the scene.

7. The method of claim 1, further comprising:

determining a position of the scene based on one or more predicted positions of the one or more objects; and positioning one or more of the two or more frame cameras, the one or more event cameras, or one or more signal beam generators that generate the one or more signal beams external to the scene.

8. The method of claim 1, further comprising:

providing two or more camera pods that each include a housing that encloses one or more frame cameras, one or more event cameras, and one or more signal beam generators; and employing the two or more camera pods to provide the two or more frame capture cameras, one or more signal beam generators, and the one or more event cameras.

9. The method of claim 1, further comprising:

presenting the scene to one or more users with one or more of a hardware display or a virtual-reality display headset.

10. A system for sensing objects:

a network computer, comprising:

a memory that stores at least instructions; and one or more processors that execute instructions that are configured to cause actions, including:

capturing a two-dimensional video of a scene with two or more frame cameras oriented towards a center of the scene;

scanning a plurality of paths across one or more objects in the scene with one or more signal beams oriented towards the center of the scene;

generating a plurality of events based on one or more signal beams that are reflected by the one or more objects and detected by one or more event cameras oriented towards the center of the scene;

generating a plurality of trajectories based on the plurality of paths and the plurality of events, wherein each trajectory is a parametric representation of a one-dimensional curve segment in a three-dimensional space; and generating a three-dimensional scene that includes a representation of the one or more objects based on the captured two-dimensional video and the plurality of trajectories, wherein a position and an orientation of the one or more represented objects in the scene are based on the plurality of trajectories; and one or more client computers, comprising:
a memory that stores at least instructions; and
one or more processors that execute instructions that are configured to cause action, including, displaying the scene to the one or more users.

11. The system of claim 10, wherein generating the scene further comprises:
determining a position of the scene based on one or more other positions of the one or more event cameras, an orientation of the two or more frame cameras, and another orientation of the one or more event cameras, wherein a portion of the scene that is outside the scene is an external scene and another portion of the scene that is inside the scene is an internal scene;
capturing two-dimensional video of the external scene employing the two or more frame cameras;
scanning a plurality of other paths across one or more other objects in the external scene with the one or more signal beams;
generating a plurality of other events based on one or more other signal beams that are reflected by the one or more other objects and detected by the one or more event cameras;
generating a plurality of other trajectories based on the plurality of other paths and the plurality of other events; and
modifying the scene based on the two-dimensional video of the external scene and the plurality of other trajectories, wherein the modified scene incorporates a representation of the one or more other objects in the external scene.

12. The system of claim 10, wherein the one or more network computer processors execute instructions that are configured to cause actions, further comprising:
attaching the two or more frame cameras to a framework to fix a position of the two or more frame cameras around the center of the scene, wherein the framework is comprised of rods or bars that encircle the scene to enable one or more frame cameras a view of one or more areas external to the scene;
attaching one or more signal generators for the one or more signal beams to the framework to fix the position of the one or more signal beams around the center of the scene to enable the one or more signal beams to scan a plurality of other paths across one or more other objects in the one or more areas external to the scene; and
attaching the one or more event cameras to the framework to fix the position of the one or more event cameras around the center of the scene to generate a plurality of other events based on the signal beams reflected by the one or more other objects in the one or more areas external to the scene.

13. The system of claim 10, wherein the one or more network computer processors execute instructions that are configured to cause actions, further comprising:
attaching the two or more frame cameras to one or more vertically oriented poles to fix a position of the two or more frame cameras around the center of the scene, wherein the one or more poles are positioned around the scene to enable one or more frame cameras to view one or more areas external to the scene;
attaching the one or more signal beam generators to the one or more vertically oriented poles to fix the position of the one or more signal beams around the center of the scene to enable the one or more signal beams to scan a plurality of other paths across one or more other objects in the one or more areas external to the scene, wherein the one or more signal beam generators generate the one or more signal beams; and
attaching the one or more event cameras to the one or more vertically oriented poles to fix the position of the one or more event cameras around the center of the scene to enable the generation of a plurality of other events based on the signal beams reflected by the one or more other objects in the one or more areas external to the scene.

14. The system of claim 10, wherein the one or more network computer processors execute instructions that are configured to cause actions, further comprising:
attaching the two or more frame cameras to one or more aerial drones, wherein the one or more flight capable drones are dynamically positioned around the scene;
attaching one or more signal beam generators to the one or more aerial drones, wherein the one or more signal beam generators generate the one or more signal beams;
attaching the one or more event cameras to the one or more aerial drones; and
updating the scene based on a current position of the one or more aerial drones.

15. The system of claim 10, wherein the one or more network computer processors execute instructions that are configured to cause actions, further comprising:
positioning one or more of the two or more frame cameras, the one or more event cameras, or one or more signal beam generators to provide one or more overlapped fields of view of the scene.

16. The system of claim 10, wherein the one or more network computer processors execute instructions that are configured to cause actions, further comprising:
determining a position of the scene based on one or more predicted positions of the one or more objects; and
positioning one or more of the two or more frame cameras, the one or more event cameras, or one or more signal beam generators that generate the one or more signal beams external to the scene.

17. The system of claim 10, wherein the one or more network computer processors execute instructions that are configured to cause actions, further comprising:
providing two or more camera pods that each include a housing that encloses one or more frame cameras, one or more event cameras, and one or more signal beam generators; and
employing the two or more camera pods to provide the two or more frame capture cameras, one or more signal beam generators, and the one or more event cameras.

18. The system of claim 10, wherein the one or more network computer processors execute instructions that are configured to cause actions, further comprising:
presenting the scene to one or more users with one or more of a hardware display or a virtual-reality display headset.

19. A network computer for sensing objects, comprising:
a memory that stores at least instructions; and
one or more processors configured that execute instructions that are configured to cause actions, including:
capturing a two-dimensional video of a scene with two or more frame cameras oriented towards a center of the scene;
scanning a plurality of paths across one or more objects in the scene with one or more signal beams oriented towards the center of the scene;

generating a plurality of events based on one or more signal beams that are reflected by the one or more objects and detected by one or more event cameras oriented towards the center of the scene;

generating a plurality of trajectories based on the plurality of paths and the plurality of events, wherein each trajectory is a parametric representation of a one-dimensional curve segment in a three-dimensional space; and generating a three-dimensional scene that includes a representation of the one or more objects based on the captured two-dimensional video and the plurality of trajectories, wherein a position and an orientation of the one or more represented objects in the scene are based on the plurality of trajectories.

20. The network computer of claim 19, wherein generating the scene further comprises:

determining a position of the scene based on one or more other positions of the one or more event cameras, an orientation of the two or more frame cameras, and another orientation of the one or more event cameras, wherein a portion of the scene that is outside the scene is an external scene and another portion of the scene that is inside the scene is an internal scene;

capturing two-dimensional video of the external scene employing the two or more frame cameras;

scanning a plurality of other paths across one or more other objects in the external scene with the one or more signal beams;

generating a plurality of other events based on one or more other signal beams that are reflected by the one or more other objects and detected by the one or more event cameras;

generating a plurality of other trajectories based on the plurality of other paths and the plurality of other events; and modifying the scene based on the two-dimensional video of the external scene and the plurality of other trajectories, wherein the modified scene incorporates a representation of the one or more other objects in the external scene.

21. The network computer of claim 19, wherein the one or more processors execute instructions that are configured to cause actions, further comprising:

attaching the two or more frame cameras to a framework to fix a position of the two or more frame cameras around the center of the scene, wherein the framework is comprised of rods or bars that encircle the scene to enable one or more frame cameras a view of one or more areas external to the scene;

attaching one or more signal generators for the one or more signal beams to the framework to fix the position of the one or more signal beams around the center of the scene to enable the one or more signal beams to scan a plurality of other paths across one or more other objects in the one or more areas external to the scene; and attaching the one or more event cameras to the framework to fix the position of the one or more event cameras around the center of the scene to generate a plurality of other events based on the signal beams reflected by the one or more other objects in the one or more areas external to the scene.

22. The network computer of claim 19, wherein the one or more processors execute instructions that are configured to cause actions, further comprising:

attaching the two or more frame cameras to one or more vertically oriented poles to fix a position of the two or more frame cameras around the center of the scene, wherein the one or more poles are positioned around the scene to enable one or more frame cameras to view one or more areas external to the scene;

attaching the one or more signal beam generators to the one or more vertically oriented poles to fix the position of the one or more signal beams around the center of the scene to enable the one or more signal beams to scan a plurality of other paths across one or more other objects in the one or more areas external to the scene, wherein the one or more signal beam generators generate the one or more signal beams; and attaching the one or more event cameras to the one or more vertically oriented poles to fix the position of the one or more event cameras around the center of the scene to enable the generation of a plurality of other events based on the signal beams reflected by the one or more other objects in the one or more areas external to the scene.

23. The network computer of claim 19, wherein the one or more processors execute instructions that are configured to cause actions, further comprising:

attaching the two or more frame cameras to one or more aerial drones, wherein the one or more flight capable drones are dynamically positioned around the scene;

attaching one or more signal beam generators to the one or more aerial drones, wherein the one or more signal beam generators generate the one or more signal beams;

attaching the one or more event cameras to the one or more aerial drones; and updating the scene based on a current position of the one or more aerial drones.

24. The network computer of claim 19, wherein the one or more processors execute instructions that are configured to cause actions, further comprising:

positioning one or more of the two or more frame cameras, the one or more event cameras, or one or more signal beam generators to provide one or more overlapped fields of view of the scene.

25. The network computer of claim 19, wherein the one or more processors execute instructions that are configured to cause actions, further comprising:

determining a position of the scene based on one or more predicted positions of the one or more objects; and positioning one or more of the two or more frame cameras, the one or more event cameras, or one or more signal beam generators that generate the one or more signal beams external to the position of the scene.

26. The network computer of claim 19, wherein the one or more processors execute instructions that are configured to cause actions, further comprising:

providing two or more camera pods that each include a housing that encloses one or more frame cameras, one or more event cameras, and one or more signal beam generators; and employing the two or more camera pods to provide the two or more frame capture cameras, one or more signal beam generators, and the one or more event cameras.

27. The network computer of claim 19, wherein the one or more processors execute instructions that are configured to cause actions, further comprising:

presenting the scene to one or more users with one or more of a hardware display or a virtual-reality display headset.

28. A processor readable non-transitory storage media that includes instructions for sensing objects, wherein execution of the instructions by one or more processors on one or more network computers performs actions, comprising:

capturing a two-dimensional video of a scene with two or more frame cameras oriented towards a center of the scene;

scanning a plurality of paths across one or more objects in the scene with one or more signal beams oriented towards the center of the scene;

generating a plurality of events based on one or more signal beams that are reflected by the one or more objects and detected by one or more event cameras oriented towards the center of the scene;

generating a plurality of trajectories based on the plurality of paths and the plurality of events, wherein each trajectory is a parametric representation of a one-dimensional curve segment in a three-dimensional space; and generating a three-dimensional scene that includes a representation of the one or more objects based on the captured two-dimensional video and the plurality of trajectories, wherein a position and an orientation of the one or more represented objects in the scene are based on the plurality of trajectories.

29. The media of claim 28, wherein generating the scene further comprises:

determining a position of the scene based on one or more other positions of the one or more event cameras, an orientation of the two or more frame cameras, and another orientation of the one or more event cameras, wherein a portion of the scene that is outside the scene is an external scene and another portion of the scene that is inside the scene is an internal scene;

capturing two-dimensional video of the external scene employing the two or more frame cameras;

scanning a plurality of other paths across one or more other objects in the external scene with the one or more signal beams;

generating a plurality of other events based on one or more other signal beams that are reflected by the one or more other objects and detected by the one or more event cameras;

generating a plurality of other trajectories based on the plurality of other paths and the plurality of other events; and modifying the scene based on the two-dimensional video of the external scene and the plurality of other trajectories, wherein the modified scene incorporates a representation of the one or more other objects in the external scene.

30. The media of claim 28, further comprising:

attaching the two or more frame cameras to a framework to fix a position of the two or more frame cameras around the center of the scene, wherein the framework is comprised of rods or bars that encircle the scene to enable one or more frame cameras a view of one or more areas external to the scene;

attaching one or more signal generators for the one or more signal beams to the framework to fix the position of the one or more signal beams around the center of the scene to enable the one or more signal beams to scan a plurality of other paths across one or more other objects in the one or more areas external to the scene; and attaching the one or more event cameras to the framework to fix the position of the one or more event cameras around the center of the scene to generate a plurality of other events based on the signal beams reflected by the one or more other objects in the one or more areas external to the scene.

31. The media of claim 28, further comprising:

attaching the two or more frame cameras to one or more vertically oriented poles to fix a position of the two or more frame cameras around the center of the scene, wherein the one or more poles are positioned around the scene to enable one or more frame cameras to view one or more areas external to the scene;

attaching the one or more signal beam generators to the one or more vertically oriented poles to fix the position of the one or more signal beams around the center of the scene to enable the one or more signal beams to scan a plurality of other paths across one or more other objects in the one or more areas external to the scene, wherein the one or more signal beam generators generate the one or more signal beams; and attaching the one or more event cameras to the one or more vertically oriented poles to fix the position of the one or more event cameras around the center of the scene to enable the generation of a plurality of other events based on the signal beams reflected by the one or more other objects in the one or more areas external to the scene.

32. The media of claim 28, further comprising:

attaching the two or more frame cameras to one or more aerial drones, wherein the one or more flight capable drones are dynamically positioned around the scene;

attaching one or more signal beam generators to the one or more aerial drones, wherein the one or more signal beam generators generate the one or more signal beams;

attaching the one or more event cameras to the one or more aerial drones; and updating the scene based on a current position of the one or more aerial drones.

33. The media of claim 28, further comprising:

positioning one or more of the two or more frame cameras, the one or more event cameras, or one or more signal beam generators to provide one or more overlapped fields of view of the scene.

34. The media of claim 28, further comprising:

determining a position of the scene based on one or more predicted positions of the one or more objects; and positioning one or more of the two or more frame cameras, the one or more event cameras, or one or more signal beam generators that generate the one or more signal beams external to the position of the scene.

35. The media of claim 28, further comprising:

providing two or more camera pods that each include a housing that encloses one or more frame cameras, one or more event cameras, and one or more signal beam generators; and employing the two or more camera pods to provide the two or more frame capture cameras, one or more signal beam generators, and the one or more event cameras.

36. The media of claim 28, further comprising:

presenting the scene to one or more users with one or more of a hardware display or a virtual-reality display headset.

* * * * *